(12) United States Patent
Hiramatsu et al.

(10) Patent No.: US 10,732,643 B2
(45) Date of Patent: Aug. 4, 2020

(54) CONTROL SYSTEM, MOVING OBJECT, AND CONTROL APPARATUS

(71) Applicant: Hitachi, Ltd., Tokyo (JP)

(72) Inventors: Yoshitaka Hiramatsu, Tokyo (JP); Takashi Sumiyoshi, Tokyo (JP); Masahito Togami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 332 days.

(21) Appl. No.: 15/757,980

(22) PCT Filed: Apr. 7, 2016

(86) PCT No.: PCT/JP2016/061429
§ 371 (c)(1),
(2) Date: Mar. 7, 2018

(87) PCT Pub. No.: WO2017/175360
PCT Pub. Date: Oct. 12, 2017

(65) Prior Publication Data
US 2018/0246525 A1    Aug. 30, 2018

(51) Int. Cl.
*G05D 1/02* (2020.01)
*G06K 9/00* (2006.01)

(52) U.S. Cl.
CPC ........ *G05D 1/0276* (2013.01); *G05D 1/0246* (2013.01); *G05D 1/0282* (2013.01); *G06K 9/00221* (2013.01); *G06K 9/00664* (2013.01); *G05D 2201/02* (2013.01); *G05D 2201/0211* (2013.01)

(58) Field of Classification Search
None
See application file for complete search history.

(56) References Cited

U.S. PATENT DOCUMENTS

2013/0329059 A1* 12/2013 Uchikoshi ............... G06F 3/005
                                              348/207.1
2017/0166299 A1*  6/2017 Fujimura ............... G05D 1/101

FOREIGN PATENT DOCUMENTS

JP        2007229814        9/2007

OTHER PUBLICATIONS

International Search Report of PCT/JP2016/061429 dated Jun. 7, 2016.

* cited by examiner

*Primary Examiner* — Lail A Kleinman
(74) *Attorney, Agent, or Firm* — Mattingly & Malur, PC

(57) ABSTRACT

A control system includes: a moving object; and a control apparatus. The moving object is configured to: determine a face direction based on whether or not a face image of the human exists; and control the movement apparatus so that the moving object moves in accordance with path information. The control apparatus is configured to: detect a position of the human and the moving object in the area; calculate, based on the position of the human and the moving object, and the face direction, the path information for allowing the moving object to arrive at any one of a position within a predetermined range from the human and in a field of view of the human and a position within the predetermined range from the human and outside the field of view of the human; and transmit the path information to the moving object.

10 Claims, 14 Drawing Sheets

CONTROL SYSTEM, MOVING OBJECT, AND CONTROL APPARATUS

BACKGROUND

This invention relates to a control system for controlling a moving object, a moving object, and a control apparatus for controlling a moving object.

In recent years, product development of robots capable of conversing and moving has been active. For example, in JP 2007-229814 A, there is disclosed an autonomous mobile robot configured to, when accompanying a specific human, move autonomously to a position from which a visual range shared with the visual range of the specific human can be obtained. When a mobile robot accompanies a specific human, this autonomous mobile robot calculates a line-of-sight observation position from which the mobile robot can observe a line of sight of the specific human, detects the line of sight of the specific human by controlling a wheel-in-motor of a travel apparatus and moving the mobile robot toward the line-of-sight observation position, and estimates the visual range of the specific human. The autonomous mobile robot also calculates a visual range viewable position from which a visual range shared with the estimated visual range of the specific human can be obtained, and moves the mobile robot toward the visual range viewable position by controlling the wheel-in-motor of the travel apparatus.

However, the autonomous mobile robot disclosed in the above-mentioned related art only detects a specific human in a range that is observed by the autonomous mobile robot. As a result, when the specific human is present in a range that is not observable by the autonomous mobile robot, the autonomous mobile robot cannot accompany the specific human. Therefore, when the specific human performs an action that is not in the field of view of the autonomous mobile robot, the autonomous mobile robot is not noticed by the specific human. Further, for example, in a security system, when the autonomous mobile robot enters the visual field of a suspicious person, the autonomous mobile robot is noticed by that suspicious person.

SUMMARY

This invention has been made in order to solve the above-mentioned problems, and it is an object of this invention to improve actions by a moving object on a human on which the moving object is to perform a predetermined action.

An aspect of the invention disclosed in this application is a control system, comprising: a moving object configured to move in an area; and a control apparatus configured to control the moving object, the moving object comprising: a first processor configured to execute a first program; a first storage device configured to store the first program; a first interface configured to communicate to/from the control apparatus; a movement apparatus configured to move the moving object; and a first camera configured to photograph a human in the area, the first processor being configured to execute: determination processing of determining a face direction in which a face of the human is facing based on whether or not a face image of the human photographed by the first camera exists; and movement control processing of controlling the movement apparatus so that the moving object moves in accordance with path information transmitted from the control apparatus, the control apparatus comprising: a second processor configured to execute a second program; a second storage device configured to store the second program; a second interface configured to communicate to/from the moving object; and a second camera configured to photograph the human and the moving object in the area, the second processor being configured to execute: detection processing of detecting a position of the human and a position of the moving object in the area based on an image of the area photographed by the second camera; calculation processing of calculating, based on the position of the human and the position of the moving object detected by the detection processing, and information on the face direction determined by the determination processing and transmitted from the first interface, the path information for allowing the moving object to arrive at any one of a position within a predetermined range from the human and in a field of view of the human and a position within the predetermined range from the human and outside the field of view of the human; and transmission processing of transmitting the path information calculated by the calculation processing to the moving object.

Another aspect of the invention disclosed in this application is a control system, comprising: a moving object configured to move in an area; and a control apparatus configured to control the moving object, the moving object comprising: a first processor configured to execute a first program; a first storage device configured to store the first program; a first interface configured to communicate to/from the control apparatus; and a movement apparatus configured to move the moving object, the first processor being configured to execute movement control processing of controlling the movement apparatus so that the moving object moves in accordance with path information transmitted from the control apparatus, the control apparatus comprising: a second processor configured to execute a second program; a second storage device configured to store the second program; a second interface configured to communicate to/from the moving object; and a second camera configured to photograph a human and the moving object in the area, the second processor being configured to execute: detection processing of detecting a position of the human and a position of the moving object in the area based on an image of the area photographed by the second camera; determination processing of determining a face direction in which a face of the human is facing based on time-series positions of the moving object detected by the detection processing; calculation processing of calculating, based on the position of the human and the position of the moving object detected by the detection processing, and the face direction determined by the determination processing, the path information for allowing the moving object to arrive at any one of a position within a predetermined range from the human and in a field of view of the human and a position within the predetermined range from the human and outside the field of view of the human; and transmission processing of transmitting the path information calculated by the calculation processing to the moving object.

According to the representative embodiments of this invention, the actions by the moving object on the human on which the moving object is to perform the predetermined action can be improved. Other objects, configurations, and effects than those described above are clarified by the following description of an embodiment.

DETAILED DESCRIPTION OF THE EMBODIMENT

First Embodiment

In a first embodiment of this invention, there is described a control system including a moving object moving within an area and a control apparatus for controlling the moving object. In the first embodiment, a human on which a predetermined action is to be performed by the moving object is set by the control apparatus, and not by the moving object. The control apparatus performs control such that the predetermined action is performed by the moving object on that human. As a result, it is not required for the moving object to set the human on which the predetermined action is to be performed. Therefore, in addition to a human who is observable from the moving object, the control apparatus can cause the moving object to perform a predetermined action on a human who is not observable from the moving object, a human who is observable from the moving object but has a face that is not detectable from the moving object, and a human other than a specific human set in advance for the moving object. Examples of the predetermined action by the moving object may include conversing with a human, providing information to a human, collecting information from a human, and preventing an action by a human with a security system.

The first embodiment is now described.

Figure 1:
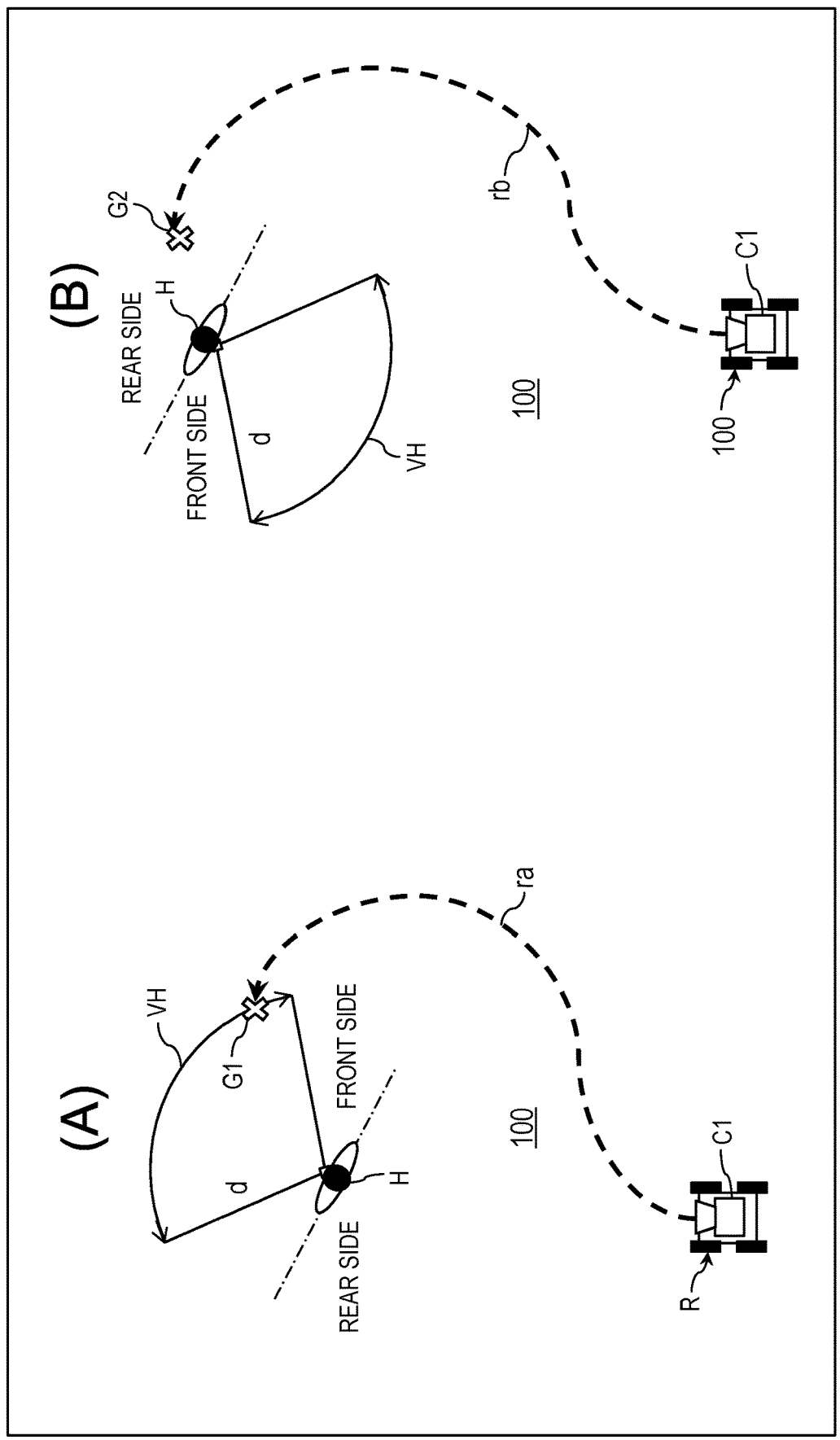
FIG. 1 is an explanatory diagram for illustrating an example of control by the control system.

FIG. 1 is an explanatory diagram for illustrating an example of control by the control system. In (A) and (B) of FIG. 1, there is illustrated an example in which a moving object R, which is moving, moves toward a human H. The moving object R is, for example, a robot. In the case of a robot, the moving object R may travel by means of wheels, or may walk or travel by means of a plurality of legs. The moving object R may also be a drone that flies. In the first embodiment, as an example, the moving object R is a robot that travels by means of wheels.

The moving object R is arranged in an area 100, which is an area to be monitored. The area 100 is, for example, a place in which humans are present, such as an event hall, an exhibition space, a transport facility, a factory, an art gallery, a museum, an open space such as a square or a plaza, and a residence. The moving object R includes one or more first cameras. A first camera C1 photographs an area from the moving object R. The first camera C1 may be fixed, or may be rotatably (i.e., rotatable about a vertical axis) supported in a horizontal direction with respect to the moving object R. The moving object R may be configured to be capable of conversing with a human by outputting speech, or may be configured to display information via images.

In (A) of FIG. 1, there is illustrated an example in which the moving object R approaches a position in a field of view VH of the human H. The control apparatus controlling the moving object R detects the position of the moving object R and the position of the human H. The moving object R determines the direction that the face of the human H is facing (hereinafter referred to as "face direction") based on an image from the first camera C1, and transmits information on the face direction to the control apparatus. The control apparatus detects path information ra based on the position of the moving object R, the position of the human H, and the face direction.

A goal location G1 of the path information ra is a position within a predetermined range (e.g., a circle with a radius d about the human H) from the human H, and in the field of view VH of the human H. The radius d is, for example, a distance set in advance, and is a range within which the human H and the moving object R can converse or touch with each other. The field of view VH is the expected range that can be seen from the human H. For example, the field of view VH may be the visual field that can be seen by both eyes by the human H (e.g., 120 degrees).

The control apparatus transmits the path information ra to the moving object R as a movement control command. The moving object R moves to the goal location G1 in accordance with the received path information ra. As a result, the human H can notice the moving object R. Stated another way, a situation in which the moving object R is not noticed despite the fact that the moving object R has approached the human H can be avoided. At the goal location G1, the moving object R turns so that the front of the moving object R faces the human H. As a result, after the movement, the moving object R can perform a predetermined action, for example, conversing, under a state in which the human H and the moving object R are facing each other.

In (B) of FIG. 1, there is illustrated a case in which the moving object R has approached to a position outside the field of view VH of the human H. The control apparatus configured to control the moving object R detects the position of the moving object R and the position of the human H. The moving object R determines the face direction of the human H based on the image from the first camera C1, and transmits information on the face direction to the control apparatus. The control apparatus calculates path information rb based on the position of the moving object R, the position of the human H, and the face direction.

A goal location G2 of the path information rb is a position within a predetermined range (e.g., a circle with a radius d about the human H) from the human H, and outside the field of view VH of the human H. The control apparatus transmits the path information rb to the moving object R as a movement control command. The moving object R moves to the goal location G2 in accordance with the received path information rb. As a result, the moving object R can approach without being noticed by the human H. Stated another way, a situation in which the moving object R is noticed when the moving object R approaches the human H can be avoided.

In this way, in (A) and (B) of FIG. 1, in the first embodiment, not the moving object R but the control apparatus sets the human H on which the moving object R is to perform a predetermined action, and the control apparatus performs control such that the moving object R performs the predetermined action on that human H. As a result, in addition to the human H who is observable from the moving object R, the control apparatus can cause the moving object R to perform a predetermined action on the human H who is not observable from the moving object R, the human H having a face that is not detectable from the moving object R, and the human H other than a specific human set in advance for the moving object R. Therefore, there is an improvement in the action by the moving object R on the human H on which the moving object R is to perform a predetermined action.

Figure 2:
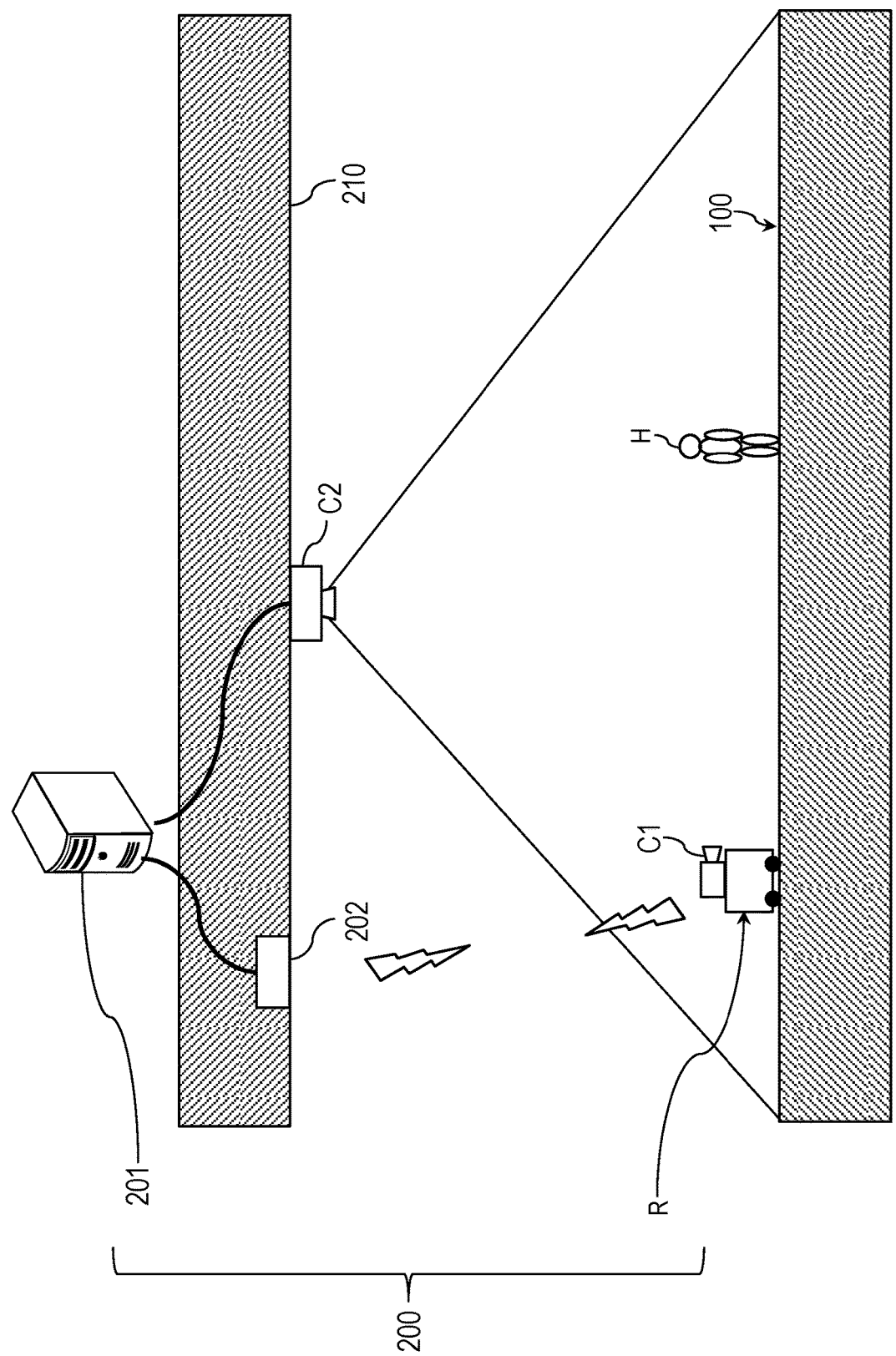
FIG. 2 is an explanatory diagram for illustrating an arrangement relationship between a control apparatus, a moving object, and a human.

FIG. 2 is an explanatory diagram for illustrating an arrangement relationship between a control apparatus, a moving object, and a human. A control system 200 includes the moving object R, which moves in the area 100, and a control apparatus 201 for controlling the moving object R. The control apparatus 201 includes a second camera C2. The second camera C2 photographs the area 100 from, for example, a ceiling 210. As long as the installation position of the second camera C2 has an overhead view of the area 100, the second camera C2 may be installed at a position other than the ceiling 210. It is not required for all of the area 100 to be covered by one second camera C2, and a plurality of second cameras C2 may each photograph an assigned region of the area 100. The control apparatus 201 is coupled to a communication device 202. The communication device 202 is, for example, arranged at the ceiling 210, and is capable of communication to/from the moving object R. It is not required for all of the area 100 to be covered by one communication device 202, and the area 100 may be covered by a plurality of communication devices 202.

<Example of System Configuration>

Figure 3:
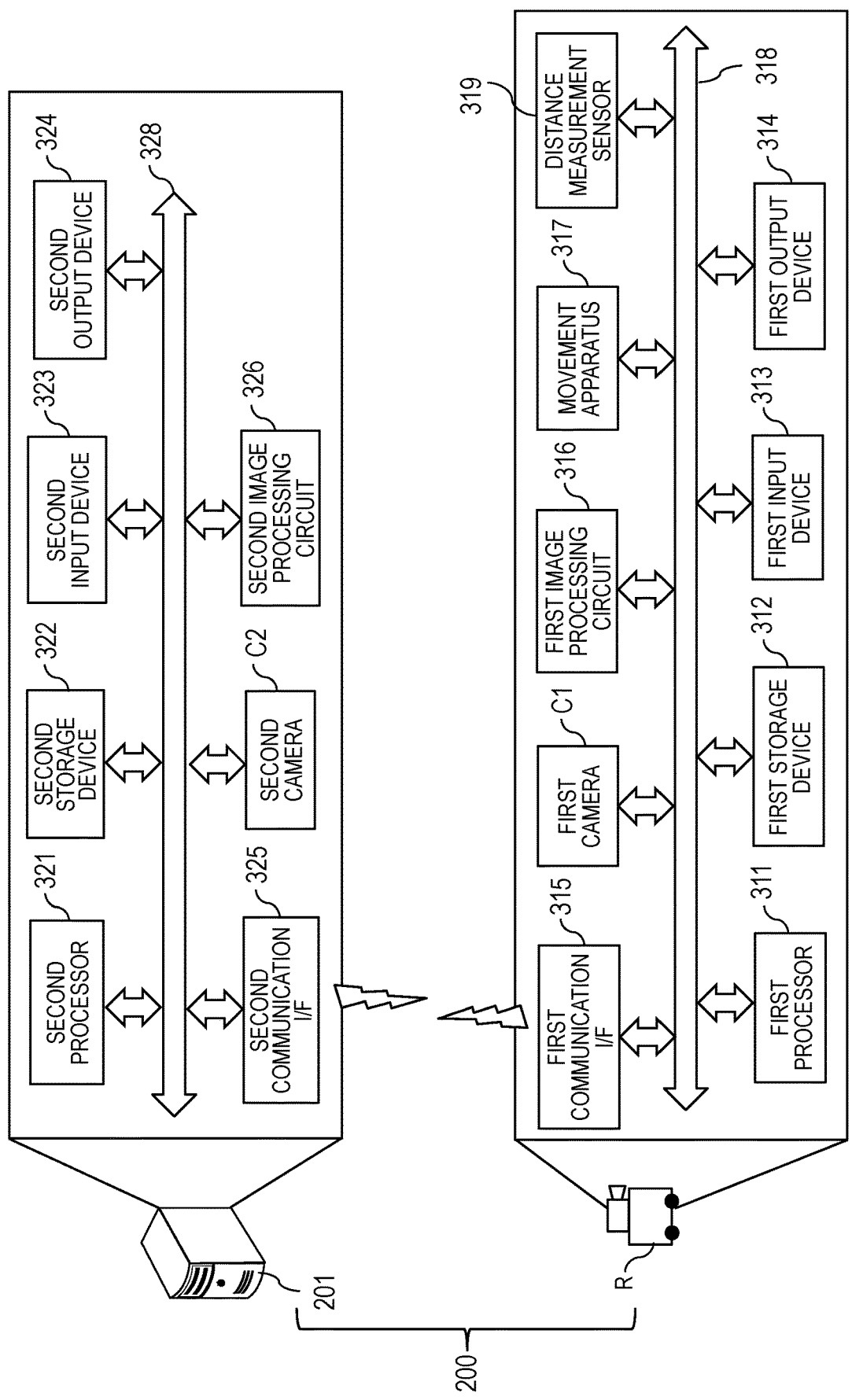
FIG. 3 is a block diagram for illustrating an example of a system configuration of the control system according to the first embodiment.

FIG. 3 is a block diagram for illustrating an example of a system configuration of the control system 200 according to the first embodiment. The moving object R includes a first processor 311, a first storage device 312, a first input device 313, a first output device 314, a first communication interface (first communication I/F) 315, a first image processing circuit 316, a movement apparatus 317, and a first camera C1. Those blocks are coupled to one another by a bus 318. The moving object R may also include a distance measurement sensor 319.

The first processor 311 controls the moving object R. The first storage device 312 serves as a work area for the first processor 311. The first storage device 312 is a non-transitory or transitory recording medium for storing various programs and data. Examples of the first storage device 312 include a read-only memory (ROM), a random-access memory (RAM), a hard disk drive (HDD), and a flash memory. The first input device 313 is for inputting data. Examples of the first input device 313 include a touch panel, a numeric keypad, and a microphone. The first output device 314 is for outputting data. Examples of the first output device 314 include a display and a speaker. The first communication I/F 315 is coupled to the control apparatus 201, and transmits and receives data to and from the control apparatus 201.

The first camera C1 photographs the surroundings of the moving object R. The first camera C1 may be, for example, a three-dimensional camera capable of calculating a distance to a subject. The first image processing circuit 316 processes the images photographed by the first camera C1. The movement apparatus 317 is a mechanism for moving the moving object R. For example, the movement apparatus 317 is a movement apparatus having wheels. The movement apparatus 317 may also be a walking/traveling mechanism having a plurality of legs. The distance measurement sensor 319 is a sensor for calculating the distance to a subject. When the first camera C1 is a three-dimensional camera, the distance measurement sensor 319 is not required.

The control apparatus 201 includes a second processor 321, a second storage device 322, a second input device 323, a second output device 324, a second communication interface (second communication I/F) 325, a second image processing circuit 326, and a second camera C2.

The second processor 321 controls the control apparatus 201. The second storage device 322 serves as a work area for the second processor 321. The second storage device 322 is a non-transitory or transitory recording medium for storing various programs and data. Examples of the second storage device 322 include a ROM, a RAM, a HDD, and a flash memory. The second input device 323 inputs data. Examples of the second input device 323 include a keyboard, a mouse, a touch panel, a numeric keypad, and a scanner. The second output device 324 outputs data. Examples of the second output device 324 include a display. The second communication I/F 325 is coupled to the moving object R, and transmits and receives data to and from the moving object R. The second communication I/F 325 corresponds to the communication device 202 illustrated in FIG. 2. The second camera C2 photographs the area 100 from overhead. The second image processing circuit 326 processes the images photographed by the second camera C2.

<Example of Functional Configuration of Control System>

Figure 4:
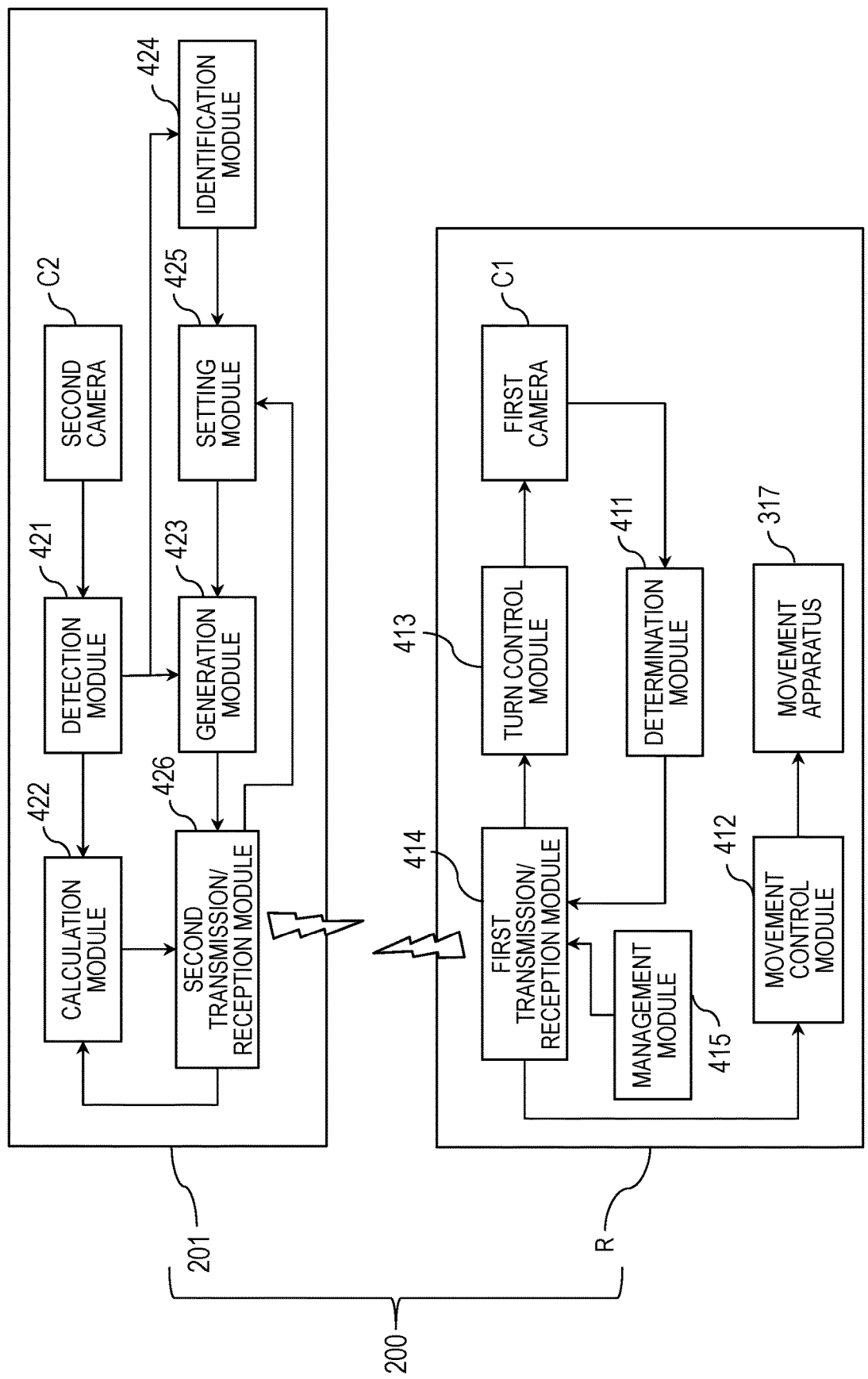
FIG. 4 is a block diagram for illustrating an example of a functional configuration of the control system according to the first embodiment.

FIG. 4 is a block diagram for illustrating an example of a functional configuration of the control system 200 according to the first embodiment. The moving object R includes a determination module 411, a movement control module 412, a turn control module 413, a first transmission/reception module 414, and a management module 415. The determination module 411, the movement control module 412, the turn control module 413, and the management module 415 are specifically implemented by, for example, the first processor 311 executing programs stored in the first storage device 312. The first transmission/reception module 414 is specifically implemented by, for example, the first communication I/F 315.

The determination module 411 determines the face direction in which the face of the human H is facing based on whether or not there is a face image of the human H photographed by the first camera C1. Specifically, for example, the determination module 411 attempts to detect, using known face image detection technology, a face image of a human in a photographed image photographed by the first camera C1. When a face image is detected, the determination module 411 determines a direction opposite to the photographing direction of the first camera C1 to be the face direction.

When a face image is not detected, the determination module 411 determines the photographing direction of the first camera C1 to be the face direction. In contrast, when a face image is detected, the determination module 411 may also determine the face direction based on a position of facial parts forming the face in the face image. The facial parts forming the face in the face image may be a facial feature such as eyes, nose, ears, mouth, or eyebrows. For example, when the eyes, ears, and eyebrows are bilaterally symmetrical about a center line in the face image, the determination module 411 determines a direction opposite to the photographing direction of the first camera C1 to be the face direction.

When the facial parts forming the face are asymmetrical in the left or right direction from a center line, the determination module 411 determines the face direction to be a direction horizontally turned from a direction opposite to the photographing direction of the first camera C1 by an angle that depends on the level of that asymmetry. The determination module 411 calculates this angle that depends on the level of that asymmetry with reference to the direction opposite to the photographing direction of the first camera C1. Correspondence information associating a template indicating the positions of the facial parts forming the face and the face direction may be stored in the first storage device 312, and the determination module 411 may acquire the face direction corresponding to that template from the correspondence information by matching the detected face image and the template.

The movement control module 412 controls the movement apparatus 317 in accordance with the path information from the control apparatus 201 so that the moving object R moves to the arrival location in the path information. Specifically, for example, as illustrated in (A) and (B) of FIG. 1, the movement control module 412 moves the moving object R to the goal locations G1 and G2 in accordance with the path information ra and rb.

The turn control module 413 turns the first camera C1 based on turn control information from the control apparatus 201. The turn control information is a command (turn control command) for controlling turning. The turn control information includes information (vector) representing a direction from the moving object R to the human H. The turn control module 413 calculates, specifically, for example, a turn angle from the current photographing direction of the first camera C1 to the direction of the human H included in the turn control information. Then, using the turn angle, the turn control module 413 turns the photographing direction of the first camera C1 in the direction of the human H.

In other words, when the first camera C1 is fixed to the moving object R, the turn control module 413 turns the photographing direction of the first camera C1 by turning the moving object R in the direction of the human H by the movement apparatus 317. When the first camera C1 is capable of turning about the moving object R, the turn control module 413 turns the first camera C1 in the direction of the human H. Even when the first camera C1 is capable of turning about the moving object R, by turning the moving object R, the turn control module 413 may turn the photographing direction of the first camera C1 while the first camera C1 remains fixed.

The first transmission/reception module 414 transmits information on the face direction to the control apparatus 201 and state information on the moving object R to the control apparatus 201, and receives turn control information from the control apparatus 201, via the first communication I/F 315. The first transmission/reception module 414 also periodically transmits state information on the moving object R to the control apparatus 201 via the first communication I/F 315.

The management module 415 monitors behavior of the moving object R, and manages the state information on the moving object R. The state information is, for example, "engaged" when the moving object R is already engaged with a given human H, and "not engaged" when the moving object R is not engaged with the given human H. As used herein, "engaged" refers to a period from the moving object R starting to move toward the human H to be engaged with until completion of a predetermined action, such as conversing with that human H. When the predetermined action is complete, the moving object R updates the state information to "not engaged".

The control apparatus 201 includes a detection module 421, a calculation module 422, a generation module 423, an identification module 424, a setting module 425, and a second transmission/reception module 426. The detection module 421, the calculation module 422, the generation module 423, the identification module 424, and the setting module 425 are specifically implemented by, for example, the second processor 321 executing programs stored in the second storage device 322. The second transmission/reception module 426 is specifically implemented by, for example, the second communication I/F 325.

The detection module 421 detects the position of the human H and the position of the moving object R in the area 100 based on the image of the area 100 photographed by the second camera C2. The control apparatus 201 has a global coordinate system relating to the area 100, a photographing range in the global coordinate system, and the position of the second camera C2 in the global coordinate system. The control apparatus 201 detects, by using the global coordinate system, an image of the human H from the photographed image from the second camera C2 based on template matching, and detects the position of the moving object R and the position of the human H in the photographed image.

The calculation module 422 calculates, based on the position of the human H and position of the moving object R detected by the detection module 421 and the information on the face direction determined by the determination module 411 from the first communication I/F 315, path information in which the moving object R is to arrive at a position (goal locations G1 and G2) within a predetermined range d from the human H and within a range of any one of inside the field of view VH of the human H and outside the field of view VH of the human H.

Specifically, for example, the calculation module 422 identifies, based on the position of the human H as an origin, the field of view VH of the human H centered on the face direction of the human H (e.g., such that when the range of the field of view VH is 120 degrees, left and right portions of the field of view VH are each 60 degrees). The selection of whether the goal location is to be in the field of view VH of the human H or outside the field of view VH of the human H is set in advance. When the goal location is set in the field of view VH of the human H, the calculation module 422 calculates the path information ra in the manner illustrated in (A) of FIG. 1. When the goal location is set outside the field of view VH of the human H, the calculation module 422 calculates the path information rb in the manner illustrated in (B) of FIG. 1. In this case, it is preferred that the calculation module 422 calculate the path information rb so that each position of the path information rb is outside the field of view VH of the human H. The search of the path information is performed using a known search algorithm.

The generation module 423 generates, based on the position of the human H and the position of the moving object R, turn control information for turning the photographing direction of the first camera C1 in a direction from which the human H can be photographed. The turn control information includes information indicating a direction from the moving object R to the human H. This information is, for example, a vector in the global coordinate system. As a result of the turn control information being transmitted to the moving object R, the photographing direction of the first camera C1 faces in the direction of the human H. Therefore, the human H detected by the second camera C2 can be photographed by the first camera C1.

The identification module 424 identifies, based on the photographed image from the second camera C2, the behavior of the human H. Specifically, for example, using the photographed image detected by the detection module 421, the identification module 424 tracks the image of the human H in the subsequent photographed images, and identifies the behavior of the human H, namely, whether the human H is stationary or is moving.

The setting module 425 sets, based on the behavior of the human H identified by the identification module 424 and the state of the moving object R, the human H as a target human on which the moving object R is to perform a predetermined action. Specifically, for example, when the behavior of the human H identified by the identification module 424 is "stationary" and the moving object R is not engaged with another human H, namely, the state information of the moving object R is "not engaged", the setting module 425 sets that human H to be the target human. As a result, the turn control module 413 generates a turn control command that causes the photographing direction of the first camera C1 to turn in a direction from which the human H set as the target human can be photographed.

The second transmission/reception module 426 receives state information from the moving object R and transmits a turn control command to the moving object R. The second transmission/reception module 426 also transmits to the moving object R a movement control command including path information.

<Example of Behavior Identification by Identification module 424>

Figure 5:
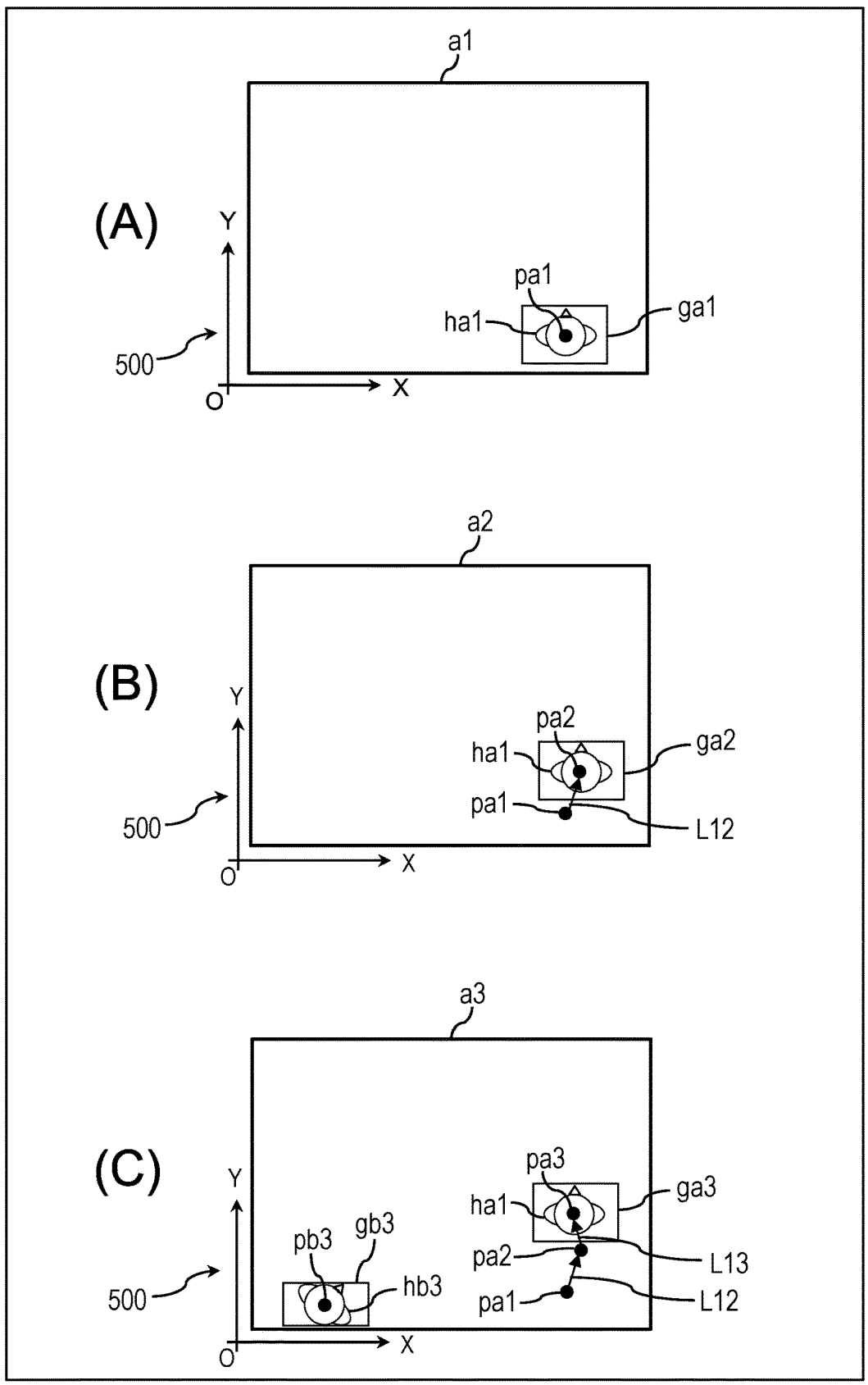
FIG. 5 is an explanatory diagram for illustrating an example of behavior identification by the identification module of the control apparatus.

FIG. 5 is an explanatory diagram for illustrating an example of behavior identification by the identification module 424 of the control apparatus 201. In (A) of FIG. 5, there is illustrated a photographed image a1 of the area 100 from the second camera C2 in a global coordinate system 500. In (A) of FIG. 5, a human image ha1 is detected. An area image ga1 is stipulated encompassing the human image ha1 centered on a position pa1 of the human image ha1. The human in the human image ha1 is a newly photographed human in the photographed image a1.

In (B) of FIG. 5, there is illustrated a photographed image a2 of the area 100 from the second camera C2 in the global coordinate system 500. The photographed image a2 is photographed at the next photograph timing from the photograph timing of (A) of FIG. 5. In (B) of FIG. 5, the human image ha1 that has moved from the position pa1 to a position pa2 is detected. In (B) of FIG. 5, there is stipulated an area image ga2 encompassing the human image ha1 centered on the position pa2 of the human image ha1. The identification module 424 tracks the area image ga1 within a predetermined range centered on the position pa1 in (A) of FIG. 5. When an image that matches or falls within a predetermined allowable range of similarity to the area image ga1 is detected, that area image is identified as the area image ga2. A path L12 is a vector from the position pa1 to the position pa2.

In (C) of FIG. 5, there is illustrated a photographed image a3 of the area 100 from the second camera C2 in the global coordinate system 500. The photographed image a3 is photographed at the next photograph timing from the photograph timing of (B) of FIG. 5. In (C) of FIG. 5, the human image ha1 that has moved from the position pa2 to a position pa3 is detected. In (C) of FIG. 5, there is stipulated an area image ga3 encompassing the human image ha1 centered on the position pa3 of the human image ha1. The identification module 424 tracks the area image ga2 within a predetermined range centered on the position pa2 in (B) of FIG. 5. When an image that matches or falls within a predetermined allowable range of similarity to the area image ga2 is detected, that area image is identified as the area image ga3. A path L23 is a vector from the position pa2 to the position pa3. In (C) of FIG. 5, there is also stipulated an area image gb3 encompassing a human image hb3 centered on a position pb3 of the human image hb3. The human in the human image hb3 is a newly photographed human in the photographed image a3.

The identification module 424 determines, when each position in the same human image for the time-series photographed images a1, a2, a3, . . . is within an allowable range within which the human H can be considered to be stationary, that the behavior of that human H is "stationary". When it is determined that each position is not within the allowable range, the identification module 424 determines that the behavior of that human H is "moving".

<Example of Generation of Turn Control Command by Generation module 423>

Figure 6:
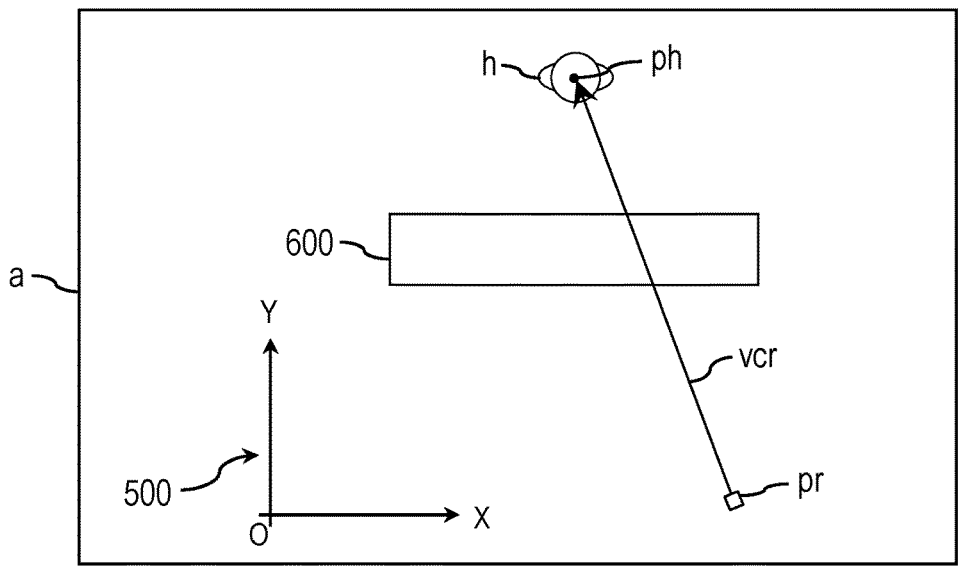
FIG. 6 is an explanatory diagram for illustrating an example of generation of a turn control command by the generation module of the control apparatus.

FIG. 6 is an explanatory diagram for illustrating an example of generation of a turn control command by the generation module 423 of the control apparatus 201. In FIG. 6, there is illustrated a photographed image a from the second camera C2. When the detection module 421 detects a position pr of the moving object R and a position ph of the human H (human image h) from the photographed image a, the generation module 423 generates a vector vcr from the position pr to the position ph. In this case, even when an obstacle 600 is present between the position pr and the position ph, the generation module 423 does not take that obstacle 600 into account. The generation module 423 transmits to the moving object R a turn control command including the vector vcr via the second transmission/reception module 426.

<Example of Determination of Face Direction by Determination module 411>

Figure 7:
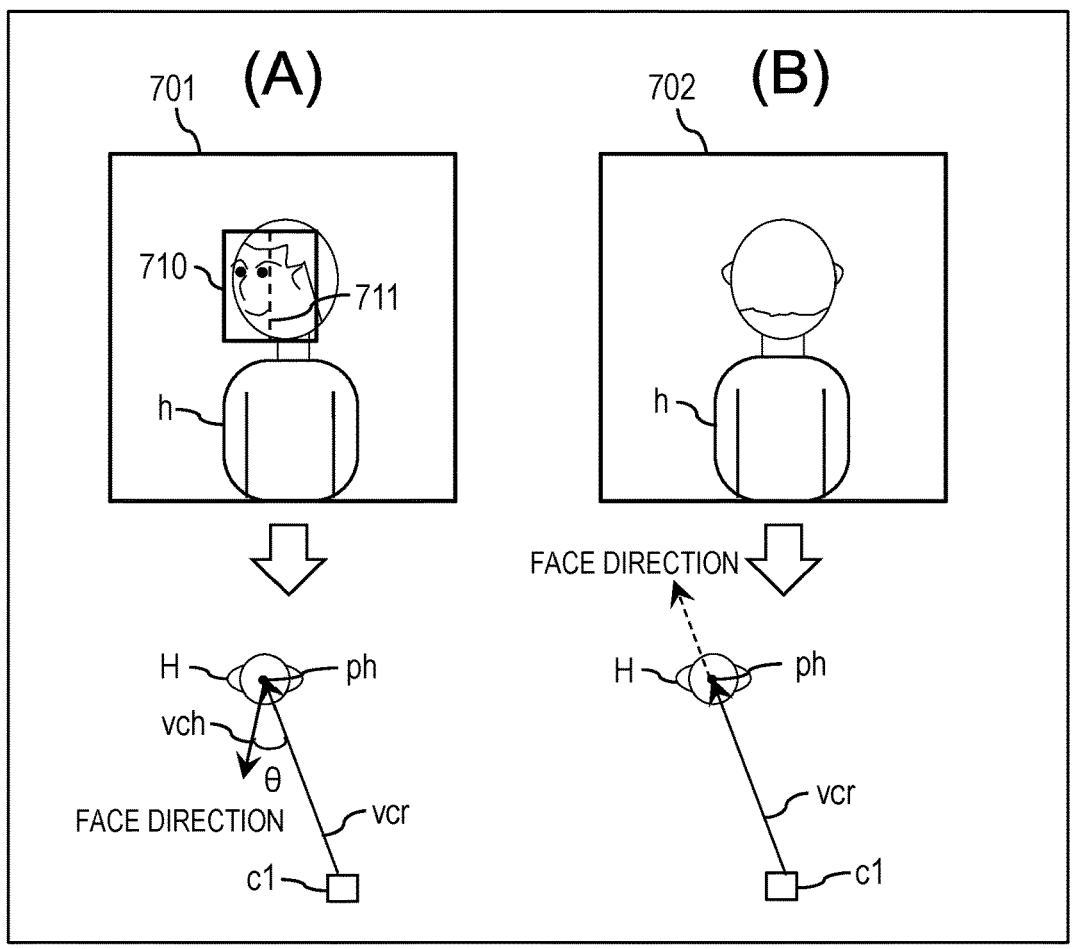
FIG. 7 is an explanatory diagram for illustrating an example of determination of a face direction by the determination module of the moving object.

FIG. 7 is an explanatory diagram for illustrating an example of determination of a face direction by the determination module 411 of the moving object R. In (A) of FIG. 7, there is illustrated an example in which a face image 510 in an image h of the human H is detected in a photographed image 701 from the first camera C1, and in (B) of FIG. 7, there is illustrated an example in which a face image in the image h of the human H is not detected in a photographed image 702 from the first camera C1. In (A) of FIG. 7, the eyes, nose, mouth, and eyebrows are detected as being asymmetrical in the left direction from a vertical center line 711 in a face image 710. The vector vcr representing the photographing direction of the first camera C1 is a vector included in the turn control command. The determination module 411 identifies a vector vch representing a direction turned in the left direction about the position ph by an angle θ that depends on the level of asymmetry with respect to a line segment opposite to the vector vcr. The direction indicated by the vector vch becomes the face direction. In the photographed image 702 of (B) of FIG. 7, a face image is not detected, and hence the determination module 411 determines the photographing direction indicated by the vector vcr to be the face direction.

<Example of Calculation of Path Information by Calculation module 422>

Figure 8:
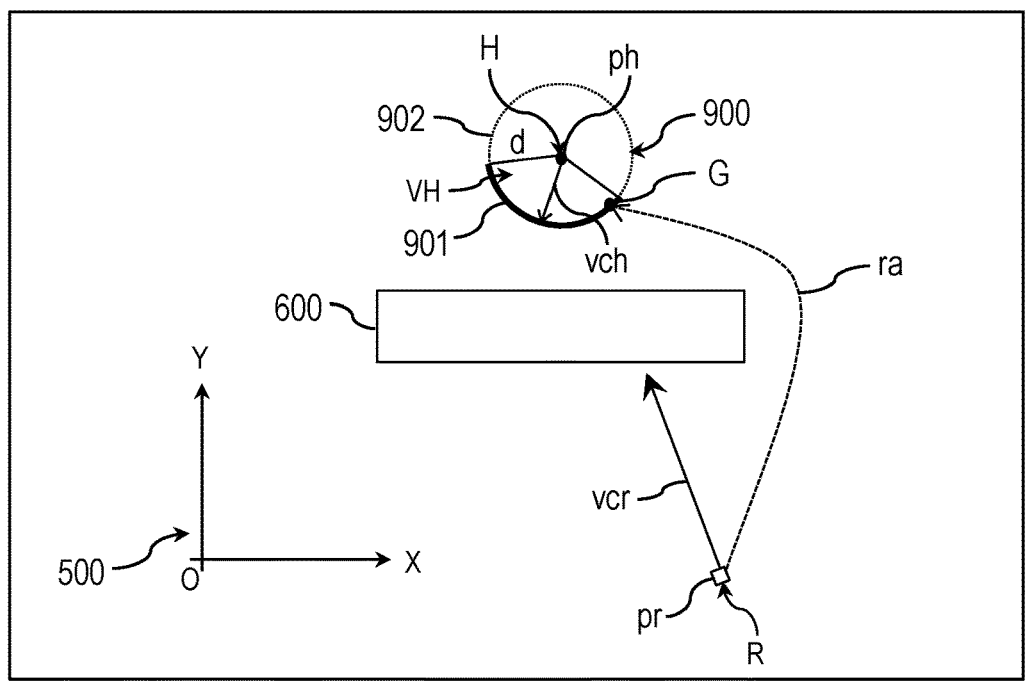
FIG. 8 is an explanatory diagram for illustrating an example of calculation of path information by the calculation module of the control apparatus.

FIG. 8 is an explanatory diagram for illustrating an example of calculation of path information by the calculation module 422 of the control apparatus 201. In FIG. 8, there is illustrated an example of calculating, when the face image of the human H is detected from the moving object R, the path information ra for arriving at a goal location G in the field of view VH of the human H from the position pr of the moving object R. The photographing range of the first camera C1 is indicated by VR. The calculation module 422 calculates the path information ra such that the path avoids the obstacle 600 and is the shortest path. Specifically, for example, the calculation module 422 specifies the goal location G that is on a circumference of a circle 900 having a radius d and is on an arc 901 in the field of view VH, and calculates the path information ra that is the shortest path to the specified goal location G.

Figure 9:
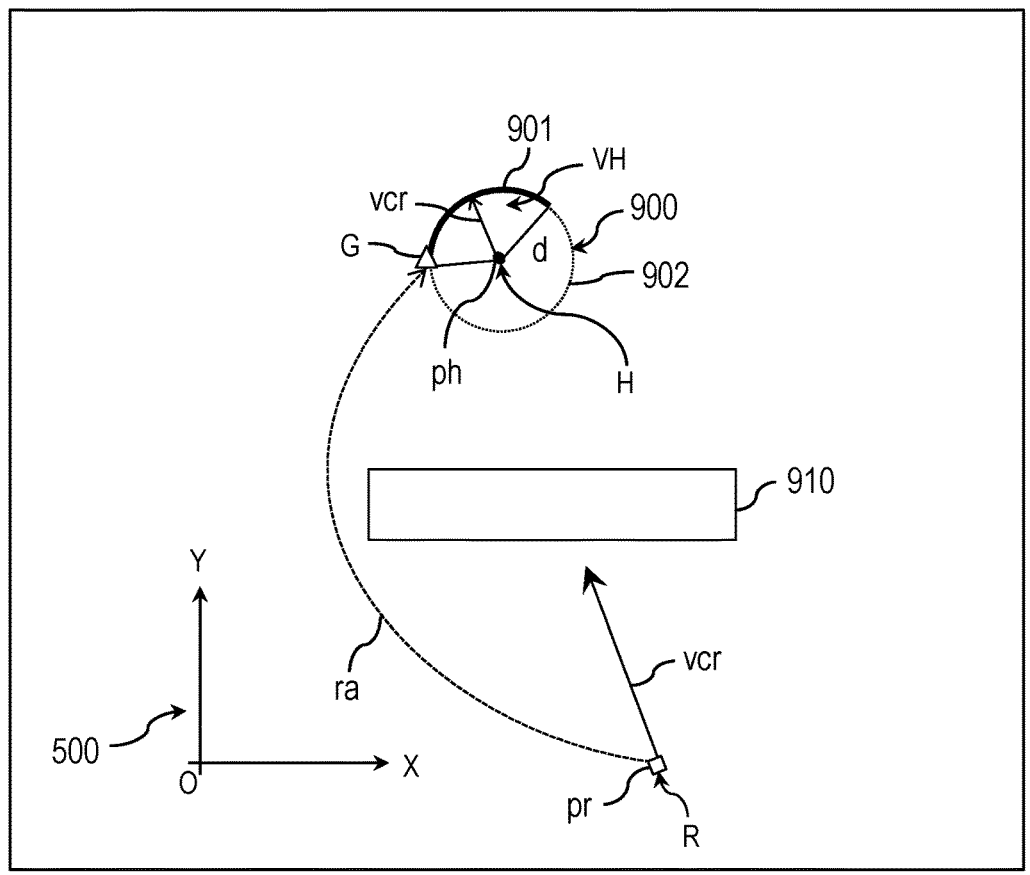
FIG. 9 is an explanatory diagram for illustrating an example of calculation of path information by the calculation module of the control apparatus.

FIG. 9 is an explanatory diagram for illustrating an example of calculation of path information by the calculation module 422 of the control apparatus 201. In FIG. 9, there is illustrated an example of calculating, when the face image of the human H is not detected from the moving object R, the path information ra for arriving at the goal location G in the field of view VH of the human H from the position pr of the moving object R. The calculation module 422 calculates the path information ra such that the path avoids the obstacle 910 and is the shortest path. Specifically, for example, the calculation module 422 specifies the goal location G that is on a circumference of a circle 900 having a radius d and is on an arc 901 in the field of view VH, and calculates the path information ra.

In the case of both FIG. 8 and FIG. 9, when calculating path information for arriving from the position pr of the moving object R to the goal location G outside the field of view VH of the human H, the calculation module 422 may calculate the path information by setting the goal location G on the arc 902 on the circumference of the circle 900.

<Example of Control Processing Procedure by Control System>

Figure 10:
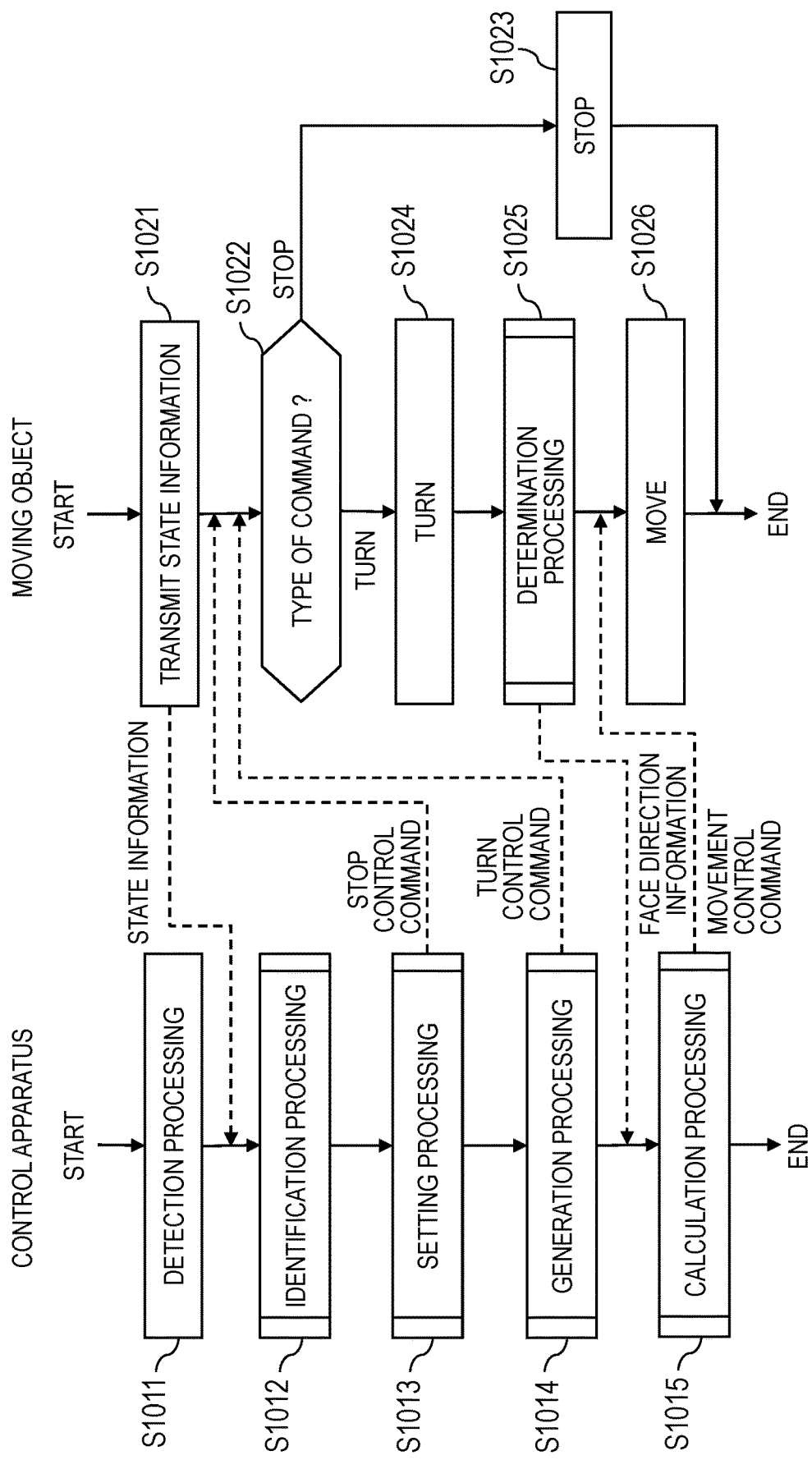
FIG. 10 is a flowchart for illustrating an example of a control processing procedure by the control system according to the first embodiment.

FIG. 10 is a flowchart for illustrating an example of a control processing procedure by the control system 200 according to the first embodiment. On the left side of the flowchart, there is illustrated an example of a processing procedure of the control apparatus 201, and on the right side of the flowchart, there is illustrated an example of a processing procedure of the moving object R. The dotted-line arrows between the left and right sides of the flowchart represent data transmission. First, the flowchart for the control apparatus 201 is described.

First, the control apparatus 201 executes detection processing by the detection module 421 (Step S1011). As a result, the position of the human H set as the target human and the position of the moving object R are detected.

Next, the control apparatus 201 executes, as illustrated in (A) of FIG. 5 to (C) of FIG. 5, identification processing by the identification module 424 (Step S1012). A detailed example of a processing procedure of the identification processing (Step S1012) is described later. As a result of the identification processing (Step S1012), the behavior of the human H identified.

Next, the control apparatus 201 receives state information from the moving object R, and then executes setting processing by the setting module 425 based on the behavior information on the human H and the state information on the moving object R (Step S1013). A detailed example of a processing procedure of the setting processing (Step S1013) is described later. As a result of the setting processing (Step S1013), the human H is set as the target human on which the moving object R is to perform a predetermined action. In the setting processing (Step S1013), the control apparatus 201 may transmit to the moving object R a stop control command for stopping the moving object R.

Next, the control apparatus 201 executes, as illustrated in FIG. 6, generation processing by the generation module 423 (Step S1014). A detailed example of a processing procedure of the generation processing (Step S1014) is described later. As a result of the generation processing (Step S1014), the vector vcr from the moving object R to the human H set as the target human is generated, and the generated vector vcr is transmitted to the moving object R as a turn control command by the second transmission/reception module 426.

Lastly, the control apparatus 201 receives from the moving object R information on the face direction, and then executes, as illustrated in FIG. 8 and FIG. 9, calculation processing by the calculation module 422 (Step S1015). A detailed example of a processing procedure of the calculation processing (Step S1015) is described later. As a result of the calculation processing (Step S1015), path information from the moving object R to the human H set as the target human is calculated, and the calculated path information is transmitted to the moving object R as a movement control command by the second transmission/reception module 426. Next, a flowchart for the moving object R is described.

First, the moving object R transmits state information on the moving object R to the control apparatus 201 by the first transmission/reception module 414 (Step S1021). Next, the moving object R determines the type of command transmitted from the control apparatus 201 (Step S1022). When the type of the received command is a stop control command (Step S1022: STOP), the moving object R controls and stops the movement apparatus 317 based on the stop control command (Step S1023). As a result, the processing by the moving object R is finished.

Meanwhile, when the type of the received command is a turn control command (Step S1022: TURN), the moving object R calculates, as a turn angle, an angle formed by the vector vcr included in the turn control command and the vector representing the photographing direction of the first camera C1, and turns the first camera C1 by that turn angle (Step S1024). As a result, the human H set as the target human by the setting module 425 of the control apparatus 201 appears in the through-the-lens image photographed by the first camera C1, and the human H is photographed.

Next, the moving object R executes, as illustrated in (A) and (B) of FIG. 7, determination processing by the determination module 411 (Step S1025). A detailed example of a processing procedure of the determination processing (Step S1025) is described later. As a result of the determination processing (Step S1025), the face direction of the human H is determined. The determined face direction is then transmitted to the control apparatus 201 by the first transmission/reception module 414.

Lastly, the moving object R receives the movement control command including the path information from the control apparatus 201, and then controls the movement apparatus 317 to move to the goal location in accordance with the path information (Step S1206). As a result, there is an improvement in the action by the moving object R on the human H targeted by the moving object R.

<Identification Processing (Step S1012)>

Figure 11:
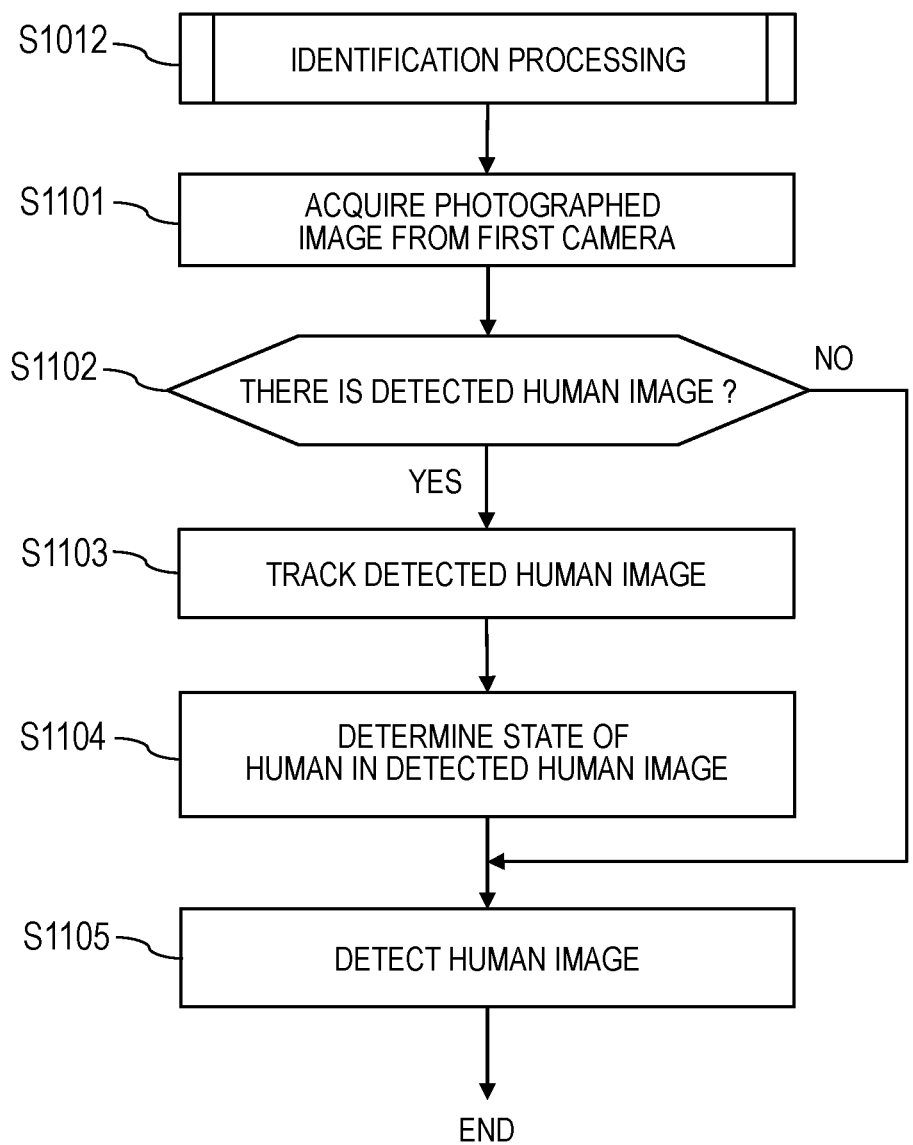
FIG. 11 is a flowchart for illustrating a detailed example of a processing procedure of the identification processing (Step S1012) illustrated in FIG. 10 by the control apparatus.

FIG. 11 is a flowchart for illustrating a detailed example of a processing procedure of the identification processing (Step S1012) illustrated in FIG. 10 by the control apparatus 201. The processing illustrated in this flowchart is executed each time a photographed image is acquired from the second camera C2. In this flowchart, for convenience, the processing is described as processing that includes the detection processing (Step S1011) of an image of the human H by the detection module 421. When a photographed image is acquired from the second camera C2 (Step S1101), the identification module 424 determines whether or not there is a detected human image (Step S1102). A detected human image is a human image detected in the photographed image acquired in the previous (i.e., the image acquired one before) time. For example, in (A) to (C) of FIG. 5, when a photographed image acquired in this Step S1101 is a2 and a photographed image acquired in the previous time is a1, the detected human image is ha1.

When there are no detected human images (Step S1102: No), the processing is advanced to Step S1105. Meanwhile, when there is a detected human image (Step S1102: Yes), the identification module 424 tracks the detected human image in the photographed image of Step S1101 (Step S1103). Specifically, for example, through use of known similar image search technology, the identification module 424 identifies in the photographed image a2 an area image ga2 that matches or falls within a predetermined allowable range of similarity to the area image ga1 including the detected human image ha1 within a predetermined range centered on the position pa1 of the detected human image ha1 in the photographed image 1a.

Next, the identification module 424 determines the state of the human in the detected human image (Step S1104). Specifically, for example, the identification module 424 determines whether or not the human H is stationary or is moving based on time-series positions of the detected human image. When the positions of the same human image are within an allowable range in which a human can be considered as being stationary, the identification module 424 determines the action of that human to be "stationary", and when the positions are not within the allowable range, determines the action of that human to be "moving".

Next, the identification module 424 attempts to detect, in the photographed image of Step S1101, a human image based on template matching (Step S1105). As a result, the identification processing (Step S1012) for a given photographing timing is finished.

<Setting Processing (Step S1013)>

Figure 12:
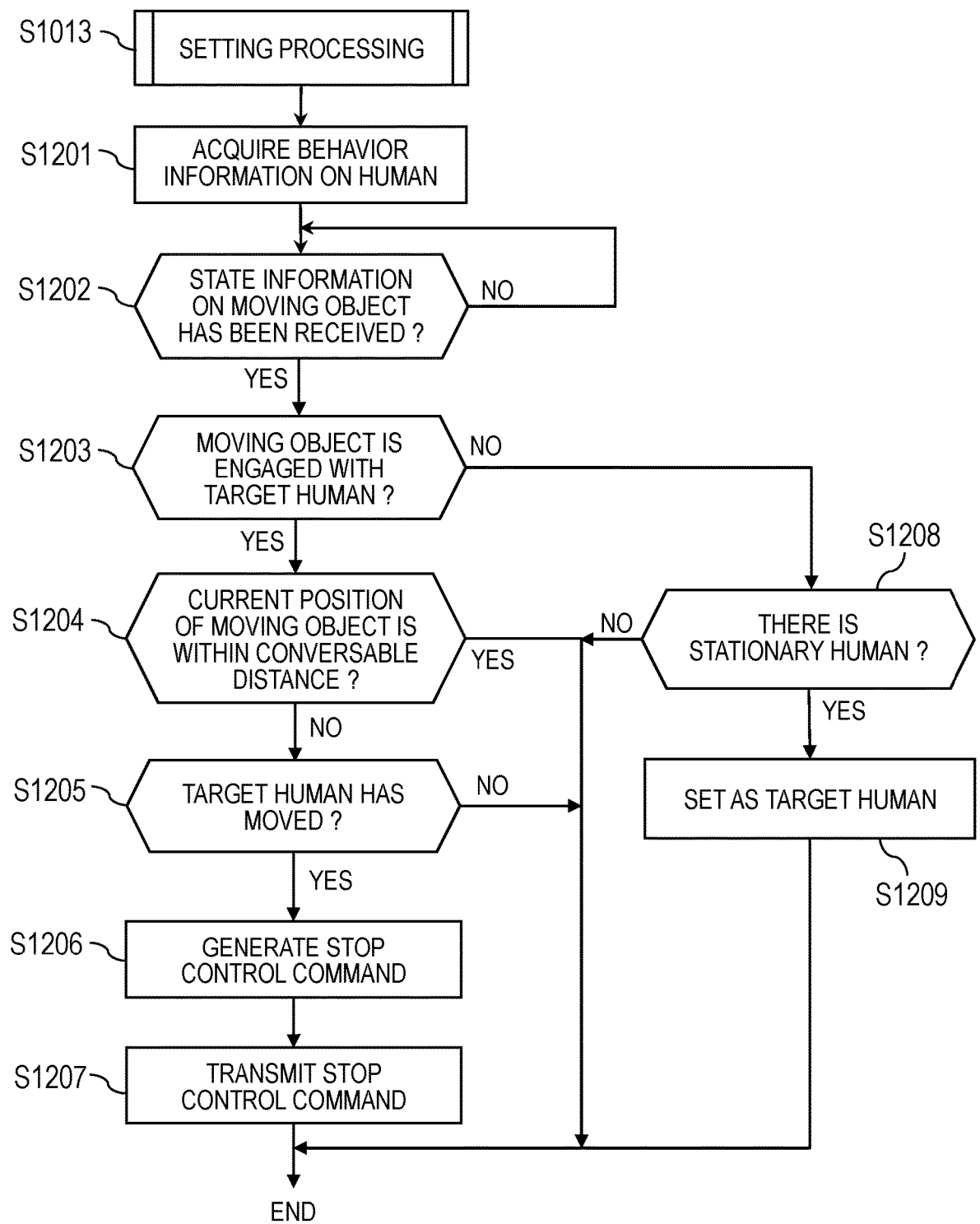
FIG. 12 is a flowchart for illustrating a detailed example of a processing procedure of the setting processing (Step S1013) illustrated in FIG. 10 by the control apparatus.

FIG. 12 is a flowchart for illustrating a detailed example of a processing procedure of the setting processing (Step S1013) illustrated in FIG. 10 by the control apparatus 201. First, the setting module 425 acquires information on the behavior of the human H identified by the identification module 424 (Step S1201). Next, the setting module 425 waits for the state information on the moving object R in Step S1021 (Step S1202: No). When the state information on the moving object R has been received (Step S1202: Yes), the setting module 425 refers to the received state information on the moving object R, and determines whether or not the moving object R is engaged with the human H (Step S1203).

When the moving object R is engaged with the target human (Step S1203: Yes), the setting module 425 refers to the photographed image, and determines whether or not the current position of the moving object R is within a conversational distance with respect to the position of the target human (Step S1204). The conversational distance is a distance set in advance as a distance in which the human H and the moving object R are capable of conversing. When the moving object R is within the conversational distance (Step S1204: Yes), the moving object R continues the predetermined action, and hence the setting module 425 ends the setting processing (Step S1013).

When the moving object R is not within the conversational distance (Step S1204: No), the setting module 425 refers to the behavior information, and determines whether or not the target human has moved (Step S1205). When the target human has not moved (Step S1205: No), the moving object R continues the predetermined action, and hence the setting module 425 ends the setting processing (Step S1013). When the target human has moved (Step S1205: Yes), this means that the predetermined action by the moving object R on the target human has ended, and hence the setting module 425 generates a stop control command (Step S1206). In place of the stop control command, the setting module 425 can also generate a movement control command for returning to an initial position set in advance.

Next, the setting module 425 transmits the stop control command to the moving object R by the second transmission/reception module 426 (Step S1207). In this case, a target human is not set, and the setting module 425 ends the setting processing (Step S1013).

Meanwhile, in Step S1203, when the moving object R is not engaged with the target human (Step S1203: No), the setting module 425 refers to the behavior information, and determines whether or not a human image of the stationary human H is present in the photographed image (Step S1208). When a human image is not present (Step S1208: No), the setting module 425 ends the setting processing (Step S1013) without setting a target human.

Meanwhile, when a human image is present (Step S1208: Yes), the setting module 425 sets the human H for which behavior information has been obtained as the target human (Step S1209). When there are a plurality of target humans H for which behavior information has been obtained, the setting module 425 sets the human H closest to the moving object R as the target human. As a result, the moving object R can approach the target human by the shortest path. Then, the setting module 425 ends the setting processing (Step S1013).

<Generation Processing (Step S1014)>

Figure 13:
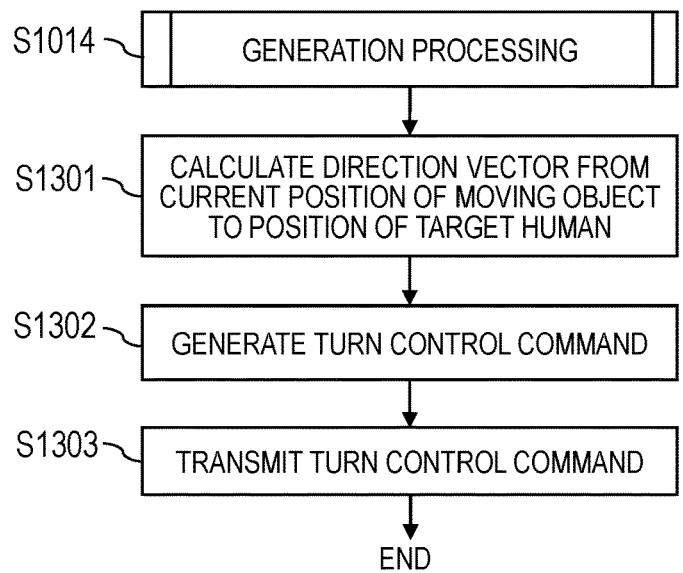
FIG. 13 is a flowchart for illustrating a detailed example of a processing procedure of the generation processing (Step S1014) illustrated in FIG. 10 by the control apparatus.

FIG. 13 is a flowchart for illustrating a detailed example of a processing procedure of the generation processing (Step S1014) illustrated in FIG. 10 by the control apparatus 201. The generation module 423 calculates, as illustrated in FIG. 6, a vector from the current position of the moving object R to the position of the target human (Step S1301). Next, the generation module 423 generates a turn control command including the calculated vector (Step S1302), and transmits the turn control command to the moving object R by the second transmission/reception module 426 (Step S1303). As a result of that processing, the generation module 423 ends the generation processing (Step S1014).

<Determination Processing (Step S1025)>

Figure 14:
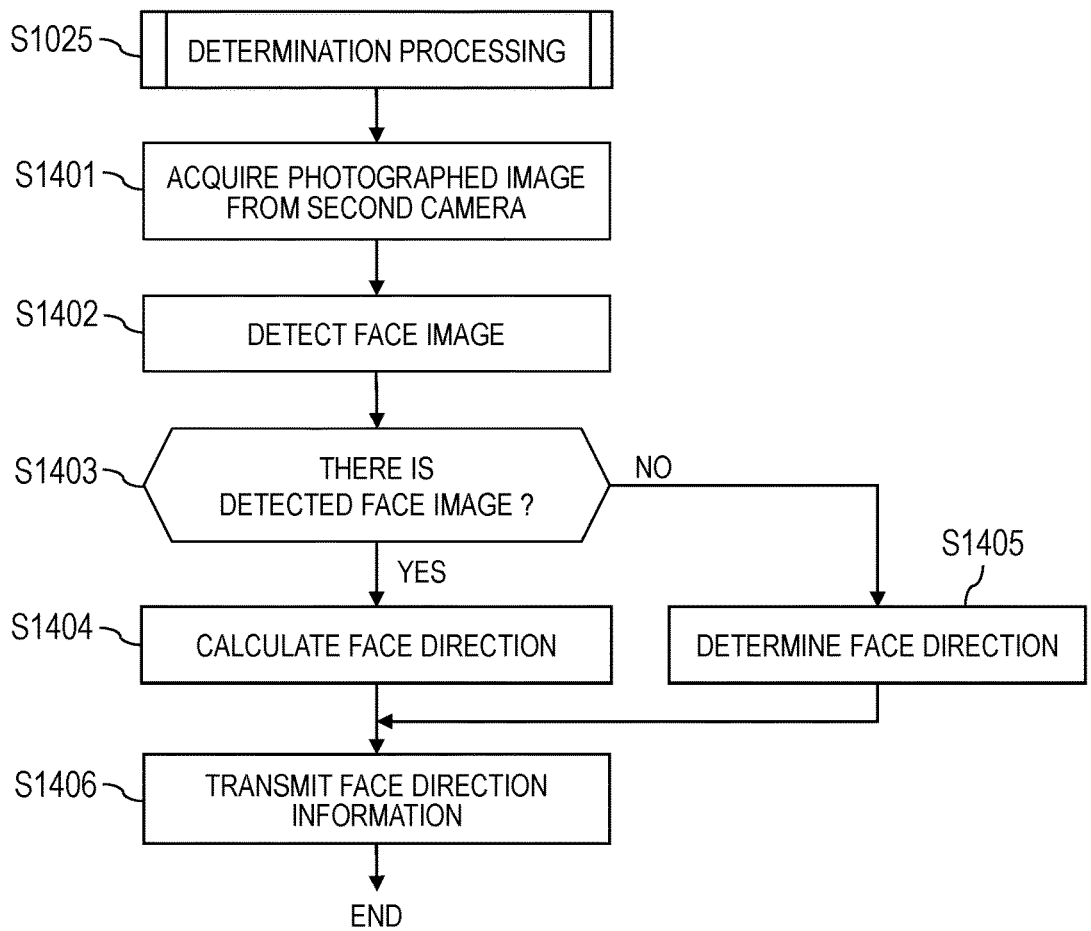
FIG. 14 is a flowchart for illustrating a detailed example of a processing procedure of the determination processing (Step S1025) illustrated in FIG. 10 by the moving object.

FIG. 14 is a flowchart for illustrating a detailed example of a processing procedure of the determination processing (Step S1025) illustrated in FIG. 10 by the moving object R. The determination module 411 acquires the photographed image from the second camera C2 (Step S1401). Next, the determination module 411 attempts to detect a face image from the photographed image (Step S1402). Specifically, for example, as illustrated in (A) of FIG. 7, the determination module 411 detects the face image 710 from the photographed image 701. However, in the case of (B) of FIG. 7, a face image is not detected.

Next, the determination module 411 determines whether or not there is a detected face image (Step S1403). When there is a face image (Step S1403: Yes), the determination module 411 calculates a face direction in the manner illustrated in (A) of FIG. 7 (Step S1404). As a result, detection of the face direction can be carried out highly accurately. The direction opposite to that of the vector vcr may also simply be taken as the face direction. In this case, detection of the face direction can be simplified.

Meanwhile, when a face image is not detected (Step S1403: No), the determination module 411 determines the direction of the vector vcr to be the face direction (Step S1405). This enables the face direction to be estimated even when a face image is not detected. Lastly, the determination module 411 transmits a vector vch representing the face direction to the control apparatus 201 as face direction information (Step S1406). As a result of that processing, the determination module 411 ends the determination processing (Step S1025).

<Calculation Processing (Step S1015)>

Figure 15:
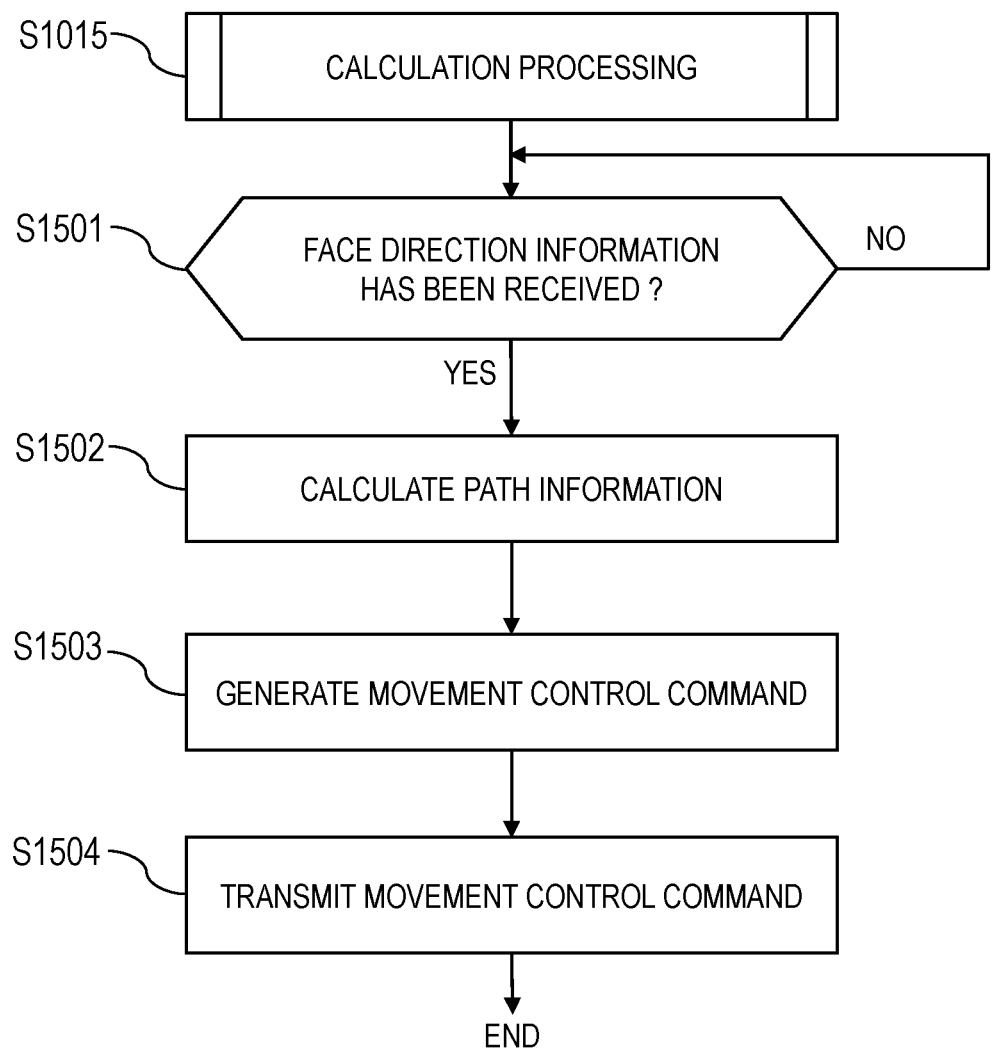
FIG. 15 is a flowchart for illustrating a detailed example of a processing procedure of the calculation processing (Step S1015) illustrated in FIG. 10.

FIG. 15 is a flowchart for illustrating a detailed example of a processing procedure of the calculation processing (Step S1015) illustrated in FIG. 10. First, the calculation module 422 waits for reception of face distribution information from the moving object R (Step S1501: No). When the face direction information has been received (Step S1501: Yes), as illustrated in FIG. 8 and FIG. 9, the calculation module 422 calculates path information (Step S1502). Next, the calculation module 422 generates a movement control command including the path information (Step S1503), and transmits the movement control command to the moving object R by the second transmission/reception module 426 (Step S1504). As a result of that processing, the calculation module 422 ends the calculation processing (Step S1015).

In this way, in the first embodiment, in addition to the human H who is observable from the moving object R, the control apparatus 201 can cause the moving object R to perform a predetermined action on the human H who is not observable from the moving object R, the human H having a face that is not detectable from the moving object R, and the human H other than a specific human set in advance for the moving object R. Therefore, there is an improvement in the action by the moving object R on the human H on which the moving object R is to perform a predetermined action. Specifically, when the moving object R approaches a position in the field of view VH of the human H, a situation in which the moving object R is not noticed despite the fact that the moving object R has approached the human H can be avoided. When the moving object R approaches a position outside the field of view VH of the human H, the moving object R can approach the human H without being noticed, and a situation in which the moving object R is noticed when the moving object R approaches the human H can be avoided.

In determining the face direction, the determination of the face direction can be simplified by determining the direction opposite to the photographing direction of the first camera C1 to be the face direction when a face image has been detected. The face direction can also be detected more accurately by determining the face direction based on the position of the facial parts forming the face. When a face image is not detected, the face direction can be estimated even in the case where there is no face image by determining the photographing direction of the first camera C1 to be the face direction. In this way, the face direction can be determined, and hence the goal location can be set depending on whether the approach method of the moving object R is to a position inside or outside the field of view VH of the human H.

The human H identified by the second camera C2 can be photographed by the first camera C1 by turning the first camera C1 in the direction of the target human. Therefore, the capturing accuracy of the human H by the moving object R can be improved. The identification accuracy of the human H can also be improved by setting the target human in accordance with the behavior of the human H and the state of the moving object R.

In Step S1403 of FIG. 14, when there is no face image (Step S1403: No), the moving object R determines the photographing direction of the first camera C1 to be the face direction (Step S1405). However, the processing may also be performed by not determining the face direction, and issuing to the control apparatus 201 a message indicating that the face direction cannot be determined in Step S1406. In this case, the control apparatus 201 may calculate, when calculating the path information in Step S1502, the goal location of the moving object R based on a moving locus formed by time-series positions of the human H.

Specifically, for example, the control apparatus 201 calculates the path information by using, when the current location of the moving object R is outside the moving locus of the human H, the closet movable location on the moving locus of the human H as the goal location. As a result, even when the face direction of the human H cannot be obtained, the moving locus of the human H can be captured by the moving object R.

Meanwhile, when the current location of the moving object R is on the moving locus of the human H, the control apparatus 201 sets that moving locus as the path information based on the current location of the human H as the goal location. In this case, calculation of the path information is not required, and hence even when the face direction of the human H cannot be obtained, the moving object R can approach the human H. In this way, by causing the moving object R to track the moving locus of the human H, the moving object R can detect the face image when the human H turns around.

Second Embodiment

A second embodiment of this invention is now described. In the first embodiment, there is described an example in which the determination processing (Step S1025) of the face direction of the human H is executed by the moving object R. However, in the second embodiment, there is described an example in which the determination processing (Step S1025) of the face direction of the human H is executed by the control apparatus 201.

In the case of the second embodiment, the determination processing (Step S1025) of the face direction of the human H is not executed by the moving object R, and hence the first camera C1 is not required. Therefore, equivalent control processing as in the first embodiment can be realized even by the moving object R that does not include the first camera C1. Further, the first camera C1 is not required in the moving object R, and hence turn control is also not required. In other words, there is no need to execute the generation processing (Step S1014), and hence the processing by the control apparatus 201 can be speeded up.

In addition, there is no need to execute the determination processing (Step S1025), and hence the processing load on the moving object R can be reduced. Still further, the control apparatus 201 executes the determination processing (Step S1025), and hence it is not required to wait for reception of face direction information as in the first embodiment, to thereby speed up the processing by the moving object R. Also, the first camera C1 is not required, and hence the cost of the moving object R can be reduced.

The second embodiment is described by focusing on the differences from the first embodiment. Like parts to those in the first embodiment are denoted using like reference symbols, and a description thereof is omitted.

<Example of Functional Configuration of Control System>

Figure 16:
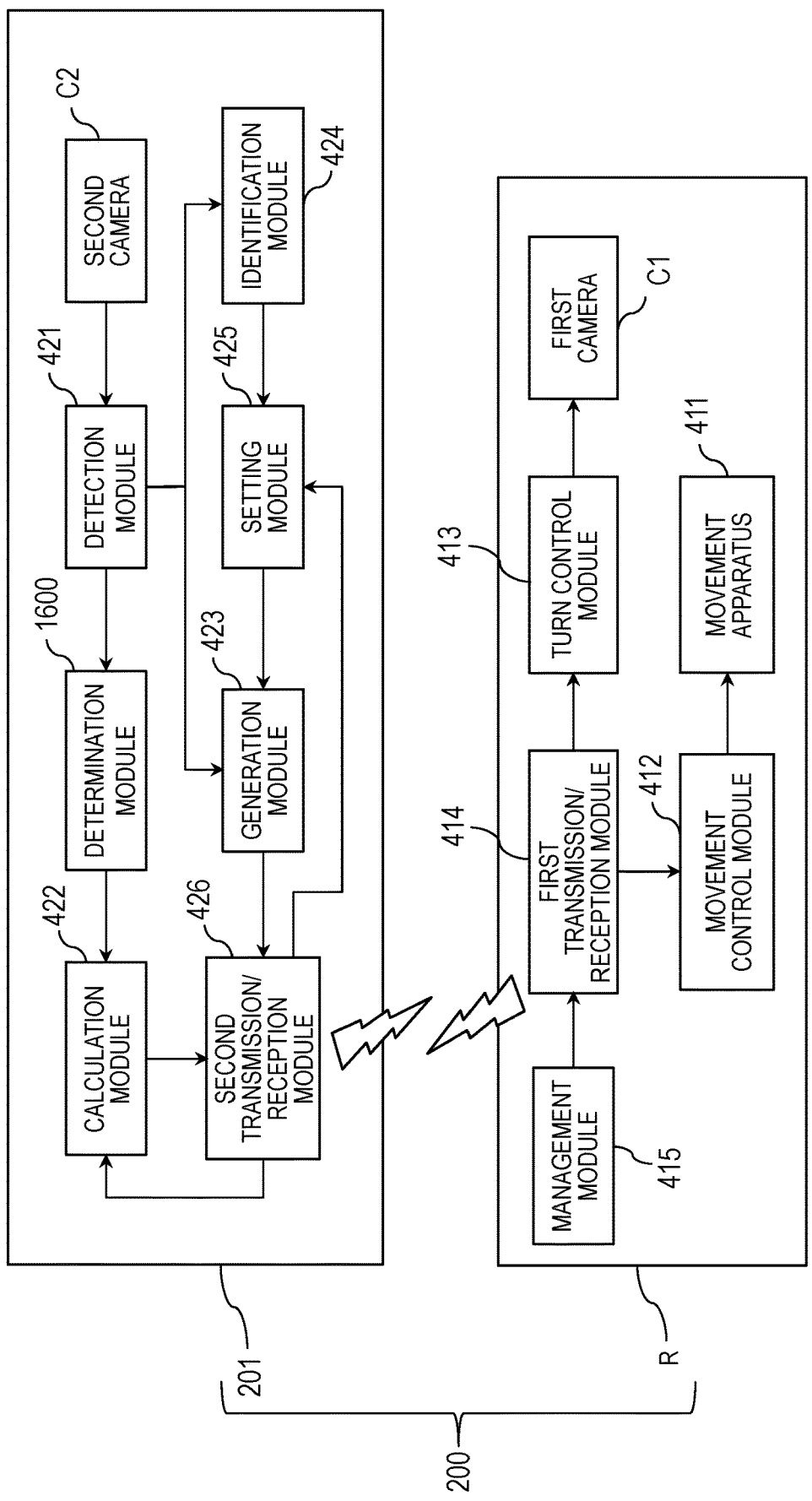
FIG. 16 is a block diagram for illustrating an example of a functional configuration of the control system in the second embodiment.

FIG. 16 is a block diagram for illustrating an example of a functional configuration of the control system 200 in the second embodiment. A difference from the first embodiment is that, in the first embodiment, in FIG. 4, the determination module 411 is arranged in the moving object R, but in the second embodiment, the determination module 411 is not included in the moving object R, and a determination module 1600 is arranged in the control apparatus 201.

The determination module 1600 does not determine the face direction as illustrated in (A) and (B) of FIG. 7. Instead, in (A) to (C) of FIG. 5, when a time-series movement path of the human H has been identified, the determination module 1600 determines the direction in which the human H is facing as the face direction. For example, in (B) of FIG. 5, the determination module 1600 determines the face direction of the human H to be the direction indicated by the path L12 from the position pa1 of the human image ha1 in the photographed image a1 acquired in the previous (i.e., the image acquired one before) time to the position pa2 of the human image ha1 in the photographed image a2 acquired this time. Similarly, in (C) of FIG. 5, the determination module 1600 determines the face direction of the human H to be the direction indicated by the path L23 from the position pa2 of the human image ha1 in the photographed image a2 acquired in the previous (i.e., the image acquired one before) time to the position pa3 of the human image ha1 in the photographed image a3 acquired this time.

<Example of Control Processing Procedure by Control System 200>

Figure 17:
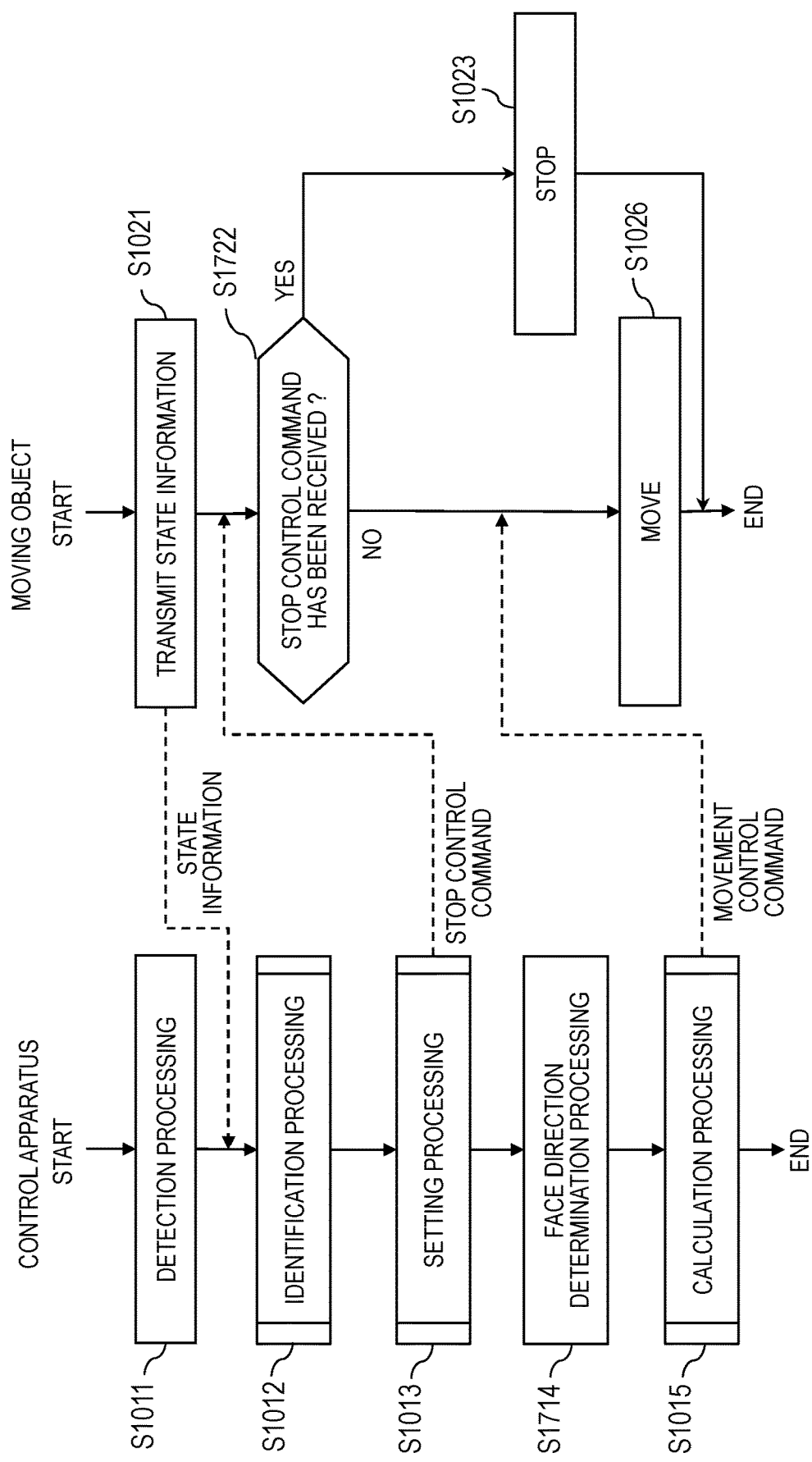
FIG. 17 is a flowchart for illustrating an example of a control processing procedure by the control system according to the second embodiment.

FIG. 17 is a flowchart for illustrating an example of a control processing procedure by the control system 200 according to the second embodiment. On the left side of the flowchart, the control apparatus 201 executes detection processing (Step S1011), and then executes face direction determination processing by the determination module 411 (Step S1714). The control apparatus 201 then executes calculation processing (Step S1015) without transmitting the determined face direction information to the moving object R.

On the right side of the flowchart, the moving object R determines whether or not a stop control command has been received within a fixed period of time since the transmission of the state information in Step S1021 (Step S1722). When a stop control command has been received within the fixed period of time (Step S1722: Yes), the moving object R stops the movement (Step S1023). Meanwhile, when a stop control command has not been received within the fixed period of time (Step S1722: No), when a movement control command is received, the moving object R moves in accordance with the path information (Step S1026).

In this way, in the second embodiment, similarly to the first embodiment, in addition to the human H who is observable from the moving object R, the control apparatus 201 can cause the moving object R to perform a predetermined action on the human H who is not observable from the moving object R, the human H having a face that is not detectable from the moving object R, and the human H other than a specific human set in advance for the moving object R. Therefore, there is an improvement in the action by the moving object R on the human H on which the moving object R is to perform a predetermined action. Specifically, when the moving object R approaches a position in the field of view VH of the human H, a situation in which the moving object R is not noticed despite the fact that the moving object R has approached the human H can be avoided. When the moving object R approaches a position outside the field of view VH of the human H, the moving object R can approach the human H without being noticed, and a situation in which the moving object R is noticed when the moving object R approaches the human H can be avoided.

As described above, the first camera C1 is not required in the moving object R, and hence equivalent control processing as in the first embodiment can be realized even by the moving object R that does not include the first camera C1. Further, the first camera C1 is not required in the moving object R, and hence there is no need to execute the generation processing (Step S1014), to thereby speed up the processing by the control apparatus 201.

In addition, there is no need to execute the determination processing (Step S1025), and hence the processing load on the moving object R can be reduced. Still further, the control apparatus 201 executes the determination processing (Step S1025), and hence it is not required to wait for reception of face direction information as in the first embodiment, to thereby speed up the processing by the moving object R. Also, the first camera C1 is not required, and hence the cost of the moving object R can be reduced.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A control system, comprising:
a moving object configured to move in an area; and
a control apparatus configured to control the moving object,
the moving object comprising:
a first processor configured to execute a first program;
a first storage device configured to store the first program;
a first interface configured to communicate to/from the control apparatus;
a movement apparatus configured to move the moving object; and
a first camera configured to photograph a human in the area, the first processor being configured to execute:
determination processing of determining a face direction in which a face of the human is facing based on whether or not a face image of the human photographed by the first camera exists; and
movement control processing of controlling the movement apparatus so that the moving object moves in accordance with path information transmitted from the control apparatus,
the control apparatus comprising:
a second processor configured to execute a second program;
a second storage device configured to store the second program;
a second interface configured to communicate to/from the moving object; and
a second camera configured to photograph the human and the moving object in the area,
the second processor being configured to execute:
detection processing of detecting a position of the human and a position of the moving object in the area based on an image of the area photographed by the second camera;
calculation processing of calculating, based on the position of the human and the position of the moving object detected by the detection processing, and information on the face direction determined by the determination processing and transmitted from the first interface, the path information for allowing the moving object to arrive at any one of a position within a predetermined range from the human and in a field of view of the human and a position within the predetermined range from the human and outside the field of view of the human; and
transmission processing of transmitting the path information calculated by the calculation processing to the moving object.

2. The control system according to claim 1, wherein in the determination processing, when the face image exists, the first processor determines that a direction opposite to a photographing direction of the first camera is the face direction.

3. The control system according to claim 1, wherein in the determination processing, when the face image exists, the first processor determines the face direction based on a position of a facial part forming a face contained in the face image.

4. The control system according to claim 1, wherein in the determination processing, when no face image exists, the first processor determines that a photographing direction of the first camera is the face direction.

5. The control system according to claim 1,
wherein the second processor is configured to:
execute generation processing of generating, based on the position of the human and the position of the moving object, turn control information for turning a photographing direction of the first camera in a direction capable of photographing the human; and
transmit, in the transmission processing, the turn control information generated by the generation processing to the moving object, and
wherein the first processor is configured to:
execute turn control processing of turning the first camera based on the turn control information transmitted from the control apparatus and received by the first interface; and
determine, in the determination processing, the face direction based on whether or not a face image of the human photographed by the first camera after the first camera is turned by the turn control processing exists.

6. The control system according to claim 5,
wherein the second processor is configured to execute:
identification processing of identifying behavior by the human based on an image photographed from the second camera; and
setting processing of setting, based on the behavior of the human identified by the identification processing and a state of the moving body, the human to be a target human on which the moving object is to perform a predetermined action, and
wherein in the generation processing, the second processor generates, based on the position of the human set as the target human and the position of the moving object, turn control information for turning a photographing direction of the first camera in a direction capable of photographing the human.

7. A control system, comprising:
a moving object configured to move in an area; and
a control apparatus configured to control the moving object,
the moving object comprising:
a first processor configured to execute a first program;
a first storage device configured to store the first program;
a first interface configured to communicate to/from the control apparatus; and
a movement apparatus configured to move the moving object,
the first processor being configured to execute movement control processing of controlling the movement apparatus so that the moving object moves in accordance with path information transmitted from the control apparatus, the control apparatus comprising:
  a second processor configured to execute a second program;
  a second storage device configured to store the second program;
  a second interface configured to communicate to/from the moving object; and
  a second camera configured to photograph a human and the moving object in the area,
the second processor being configured to execute:
  detection processing of detecting a position of the human and a position of the moving object in the area based on an image of the area photographed by the second camera;
  determination processing of determining a face direction in which a face of the human is facing based on time-series positions of the moving object detected by the detection processing;
  calculation processing of calculating, based on the position of the human and the position of the moving object detected by the detection processing, and the face direction determined by the determination processing, the path information for allowing the moving object to arrive at any one of a position within a predetermined range from the human and in a field of view of the human and a position within the predetermined range from the human and outside the field of view of the human; and
  transmission processing of transmitting the path information calculated by the calculation processing to the moving object.

8. The control system according to claim 7,
wherein the moving object comprises a first camera configured to photograph the human in the area,
wherein the second processor is configured to:
  execute generation processing of generating, based on the position of the human and the position of the moving object, turn control information for turning a photographing direction of the first camera in a direction capable of photographing the human; and
  transmit, in the transmission processing, the turn control information generated by the generation processing to the moving object, and
wherein the first processor is configured to execute turn control processing of turning the first camera based on the turn control information transmitted from the control apparatus and received by the first interface.

9. The control system according to claim 8,
wherein the second processor is configured to execute:
  identification processing of identifying behavior by the human based on an image photographed from the second camera; and
  setting processing of setting, based on the behavior of the human identified by the identification processing and a state of the moving body, the human to be a target human on which the moving object is to perform a predetermined action, and
wherein in the generation processing, the second processor generates, based on the position of the human set as the target human and the position of the moving object, turn control information for turning a photographing direction of the first camera in a direction capable of photographing the human.

10. A control apparatus, which is configured to control a moving object,
the moving object comprising a first camera configured to photograph an area, and being configured to move in the area,
the control apparatus comprising:
a processor configured to execute a program;
a storage device configured to store the program;
an interface configured to communicate to/from the moving object; and
a second camera configured to photograph a human and the moving object in the area,
the processor being configured to execute:
detection processing of detecting a position of the human and a position of the moving object in the area based on an image of the area photographed by the second camera;
generation processing of generating, based on the position of the human and the position of the moving object detected by the detection processing, turn control information for turning a photographing direction of the first camera in a direction capable of photographing the human;
first transmission processing of transmitting the turn control information generated by the generation processing to the moving object;
calculation processing of calculating, when information on a face direction in which a face of the human is facing has been received from the moving object as a result of transmission of the turn control information to the moving object by the first transmission processing, based on the position of the human and the position of the moving object, and the face direction, path information for allowing the moving object to arrive at any one of a position within a predetermined range from the human and in a field of view of the human and a position within the predetermined range from the human and outside the field of view of the human; and
second transmission processing of transmitting the path information calculated by the calculation processing to the moving object.

* * * * *